(12) United States Patent
Lindholm et al.

(10) Patent No.: US 12,017,618 B2
(45) Date of Patent: Jun. 25, 2024

(54) SUPPORTING UNIT FOR A BIKE CARRIER

(71) Applicant: Thule Sweden AB, Hillerstorp (SE)

(72) Inventors: Olof Lindholm, Värnamo (SE);
Thomas Svensson, Värnamo (SE);
Andreas Arvidsson, Sävsjo (SE);
Simon Stråth, Jonkoping (SE); Simon Nordström, Hillerstorp (SE); Hannes Olaison, Ulricehamn (SE)

(73) Assignee: Thule Sweden AB, Hillerstorp (SE)

( * ) Notice: Subject to any disclaimer, the term of this patent is extended or adjusted under 35 U.S.C. 154(b) by 51 days.

(21) Appl. No.: 17/628,478

(22) PCT Filed: Nov. 11, 2020

(86) PCT No.: PCT/EP2020/081769
§ 371 (c)(1),
(2) Date: Jan. 19, 2022

(87) PCT Pub. No.: WO2021/121788
PCT Pub. Date: Jun. 24, 2021

(65) Prior Publication Data
US 2022/0274531 A1 Sep. 1, 2022

(30) Foreign Application Priority Data
Dec. 20, 2019 (EP) .................................... 19218731

(51) Int. Cl.
*B60R 9/048* (2006.01)
*B60R 9/10* (2006.01)

(52) U.S. Cl.
CPC ................ *B60R 9/048* (2013.01); *B60R 9/10* (2013.01)

(58) Field of Classification Search
CPC ....................................................... B60R 9/10
See application file for complete search history.

(56) References Cited

U.S. PATENT DOCUMENTS

| 583,728 | A | * | 6/1897 | Brow | ...................... | B60R 25/09 |
| | | | | | | 70/228 |
| 6,892,913 | B1 | * | 5/2005 | Andersson | ............... | B60R 9/10 |
| | | | | | | 224/571 |

(Continued)

FOREIGN PATENT DOCUMENTS

| CN | 109050719 A * 12/2018 ............... B62H 3/00 |
| DE | 31 37 348 A1 8/1982 |

(Continued)

OTHER PUBLICATIONS

International Preliminary Report on Patentability in International Application No. PCT/EP2020/081769, mailed May 17, 2022, 5 pages.

(Continued)

*Primary Examiner* — Scott T McNurlen
(74) *Attorney, Agent, or Firm* — Sterne, Kessler, Goldstein & Fox P.L.L.C.

(57) ABSTRACT

Disclosed is a supporting unit for a bike carrier. The supporting unit is configured for fixedly holding a mounting portion mountable to the fork of a bike instead of a wheel or being formed by a part other than the wheel of the bike to be transported, for example by a portion of the fork of the bike. The supporting unit comprises a locking mechanism for receiving the mounting portion and to be transferable between a locking state in which the mounting portion is non-releasably fixed on the supporting unit and an unlocking state in which the mounting portion is dismountable from the supporting unit. The locking mechanism is lockable by receiving a force from the mounting portion upon inserting the mounting portion into the supporting unit so that the locking mechanism is transferable into the locking state by the force exerted on the locking mechanism by the mounting portion.

19 Claims, 15 Drawing Sheets

(56) References Cited

U.S. PATENT DOCUMENTS

| | | | | |
|---|---|---|---|---|
| 7,757,914 | B2 * | 7/2010 | Book | B60R 9/048 224/924 |
| 9,169,673 | B2 * | 10/2015 | Chen | E05B 47/0001 |
| 9,376,065 | B2 * | 6/2016 | Budd | B60R 9/10 |
| 9,896,034 | B2 * | 2/2018 | Ward | B60R 9/04 |
| 2006/0096340 | A1 * | 5/2006 | Laquieze | B62H 3/04 70/225 |
| 2010/0301082 | A1 | 12/2010 | Beckley | |

FOREIGN PATENT DOCUMENTS

| | | | | |
|---|---|---|---|---|
| DE | 102017101323 A1 * | 7/2018 | | B60R 9/048 |
| DE | 202018105215 U1 * | 11/2018 | | |
| DE | 20 2019 104794 U1 | 10/2019 | | |
| EP | 2863070 A1 * | 4/2015 | | B60R 9/048 |
| EP | 2 974 910 A1 | 1/2016 | | |
| EP | 3 351 432 A1 | 7/2018 | | |
| EP | 3 476 655 A1 | 5/2019 | | |
| ES | 2351814 A1 * | 2/2011 | | B62H 3/08 |

OTHER PUBLICATIONS

International Search Report issued in International Application No. PCT/EP2020/081769, mailed Nov. 27, 2020, 4 pages.
Written Opinion of the International Searching Authority issued in PCT/EP2020/081769, mailed Nov. 27, 2020, 4 pages.

* cited by examiner

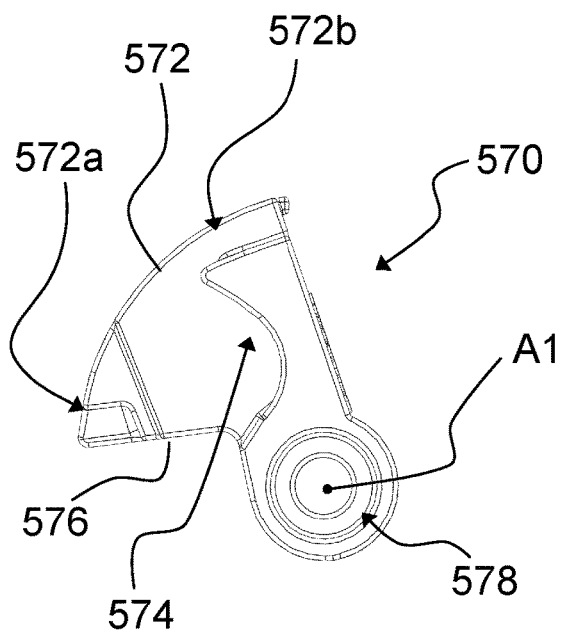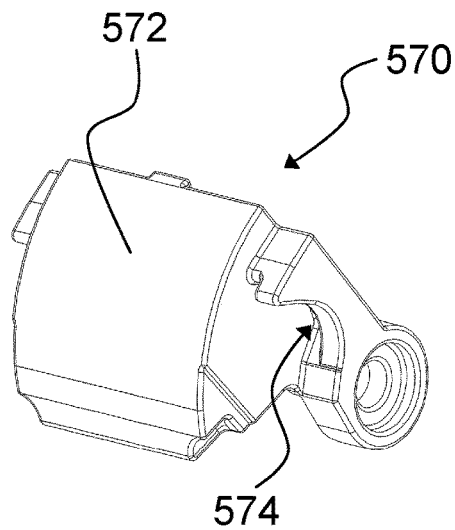
Fig. 10  Fig. 11
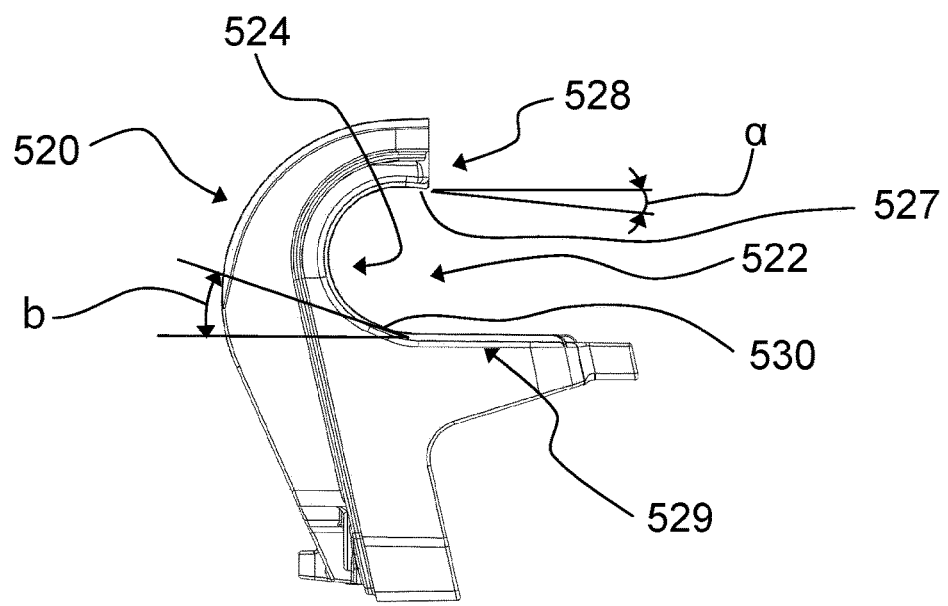
Fig. 12

SUPPORTING UNIT FOR A BIKE CARRIER

FIELD OF THE INVENTION

The present invention relates to a supporting unit for a bike carrier as well as to a bike carrier comprising such a supporting unit. In particular, embodiments relate to supporting units, bike carriers as well as mounting aids or mounting portions which can be used in combination with the supporting unit.

BACKGROUND

Bike carriers which are configured to transport bikes with their front wheel dismounted are well-known in the art. In such bike carriers, the fork of the bike is typically fixedly held on a supporting unit in order to fixedly hold the bike on the bike carrier. There are different fork types requiring such bike carriers to be adaptable to the different fork types. As fork types, quick release skewer type forks as well as thru axle type forks are known. However, mounting such forks to supporting units of bike carriers is often cumbersome and requires multiple steps to be performed by a user. For example, in prior art solutions, the user needs to hold the bike and operate or tighten a mechanism for clamping a front axle of a bike.

SUMMARY OF THE INVENTION

In the view of the above drawbacks, it is an object of the invention to provide a supporting unit for a bike carrier which allows for an easier mounting and dismounting of the bike on the supporting unit. Furthermore, it is an object of the invention to provide a mounting aid that provides an interface between the fork of a bike and the supporting unit. In connection with the enhanced supporting unit and the mounting aid, it is also an object of the present invention to provide an enhanced method of mounting a bike on a bike carrier.

The object of the invention is solved by the independent claims as well as by the items summarized in the description, in particular the different configurations as mentioned in itemized structure. Advantageous further formations are subject of the dependent claims.

According to a first aspect of the present disclosure, a supporting unit for a bike carrier is provided. The supporting unit is configured for fixedly holding a mounting portion mountable to the fork of a bike instead of a wheel or being formed by a part other than the wheel of the bike to be transported. For example, such a part other than the wheel of the bike can be a portion of the fork of the bike.

The supporting unit comprises a locking mechanism which is configured to receive the mounting portion and to be transferable between a locking state in which the mounting portion is non-releasably fixed on the supporting unit and an unlocking state in which the mounting portion is dismountable from the supporting unit. The locking mechanism is configured to be lockable by receiving a force from the mounting portion upon inserting the mounting portion into the supporting unit. In this way, the locking mechanism is transferable into the locking state by the force exerted on the locking mechanism by the mounting portion.

Accordingly, the locking mechanism is designed to be operated by the mounting portion which is inserted into the supporting unit. In this way, it is not necessary to provide an additional operating member that has to be operated by a user in order to fixedly mount the bike on the supporting unit. According to the present disclosure, elements of the locking mechanism may be operated only by a force received from the mounting portion. Accordingly, a configuration is provided in which a movement of the bike for moving the mounting portion operates the locking mechanism. Thus, it can be said that a bike including the mounting portion functions as an operating member for operating the locking mechanism. Such a configuration has the benefit, that the user does not have to hold the bike in place on the bike carrier while operating a locking mechanism but is able to hold the bike and operate the locking mechanism with both hands on the bike. This considerably enhances the often cumbersome mounting process for mounting a bike on the bike carrier.

According to an embodiment, the locking mechanism can comprise an arrangement for positively locking the mounting portion between at least two locking members. Preferably, two locking members are provided. It is to be noted, that positively locking in the context of the present disclosure does not necessarily mean that the mounting portion is clamped between the locking members. Rather, positively locking only has the meaning of providing a state in which the mounting portion is held in a manner that it cannot come off of the bike carrier, preferably by a positive locking connection or form fit coupling. In order to establish such a positive locking, it is possible to provide locking members that are able to at least partially enclose the mounting portion and/or comprise engaging portions that can be engaged with a mounting portion. At least one of the locking members can be arranged moveable with respect to the other one of the at least two locking members in order to positively lock the mounting portion. Accordingly, one of the locking members can be arranged movable towards and away from another one of the locking members.

According to a further embodiment, the at least two locking members can comprise receiving sections for partially receiving the mounting portion. The receiving section can comprise a U-shape, preferably oriented vertically upwards in a use condition, for example in a condition in which the supporting unit is mounted on a roof of a vehicle. Preferably, the receiving sections are configured as clamping sections adapted to clamp the mounting portion when the locking mechanism is in the locking state. In this way, the mounting portion can be fixedly held between the locking members. The receiving sections can comprise a configuration at least partially following an outer contour of the mounting portion. For example, in case the mounting portion has a curved surface which comes into contact with a receiving section, the receiving section can also be formed curved, for example with identical radius or with slightly greater radius.

According to a further preferable embodiment, the locking mechanism can be configured to at least partially automatically transfer into the locking state when the mounting portion is at least partially inserted into the supporting unit. Accordingly, the supporting unit can be configured such that an insertion of the mounting portion up to a certain extent can trigger a locking action of the locking mechanism. For example, a movement of one of the locking members to a certain extent can trigger a locking action of the locking mechanism. Thus, the supporting unit may be configured with a locking mechanism that is self-locking. Accordingly, no separate actuation is needed. A further advantage resides in the fact that the mounting portion, when the same is not part of the fork, can be provided on the fork with the bike on the ground. The bike with the mounting portion can then easily be fixed on the supporting unit.

According to a further embodiment, the supporting unit may further comprise a blocking unit for blocking a movement of the at least one movable locking member in at least an opening direction of the at least one movable locking member. The movable locking member is movable between an open position and a closed position. In the open position, it is possible to insert the mounting portion and the supporting unit while in the closed position, dismounting of the mounting portion from the supporting unit is not possible and the mounting portion is held on the supporting unit at least in a positive locking manner. The blocking unit as described before is configured to at least block a movement of the movable locking member towards the open position. Preferably, the blocking unit comprises an engaging unit which is configured to engage behind or with the at least one movable locking member in order to temporarily block a movement of the at least one moveable locking member in the opening direction, i.e. until the engaging unit is brought out of engagement with the movable locking member. For example, the engaging unit can be configured such that it can be brought into a space behind the movable locking member when the same was moved towards the closed position to a certain extent. Accordingly, such an engaging member can be temporarily arranged behind the movable locking member in order to serve as an abutment for blocking a movement in the opening direction. On the other hand, it is also possible to provide an engaging unit which establishes an engagement with the moveable locking member, in particular by bringing an element into engagement with a corresponding portion on the moveable locking member, for example a recess, opening, hole or teeth, such that a movement of the same is at least prevented in the opening direction. In the context of the present disclosure, temporarily block a movement shall mean that it is possible to disengage the engaging unit from the at least one moveable locking member in order to release a movement of the moveable locking member in the opening direction, in particular to disengage the engaging unit from the movable locking member without destroying the same.

According to a further embodiment, the blocking unit can comprise a blocking member which is movable between a locking position and an unlocking position. In the locking position, the blocking member blocks a movement of the movable locking member. In the unlocking position, the movable locking member is free to move in opening direction. The blocking member can be translatory movably arranged in the blocking unit. For example, the blocking member can be slidingly arranged in the blocking unit. On the other hand, it is also possible to provide a blocking member which is pivotably movably arranged in the blocking unit. It is further possible to provide a movement which comprises a translatory and pivotable movement wherein both movements may be superimposed.

According to a further preferable embodiment, the blocking member can be biased towards the locking position by means of a biasing member. The biasing member can be a spring or any suitable urging member that allows to pre-bias the blocking member in the desired direction. The spring may be a coil spring. If the blocking member is biased towards the locking position, the blocking member is able to automatically engage behind or with the movable locking member when the at least one movable locking member has been moved by a predetermined distance towards a positive locking position. Accordingly, the blocking member may be configured such that it rides on a portion of the locking member and snaps behind the locking member or into a recess or opening when the same is moved up to a certain position.

According to a further embodiment, the blocking member can comprise a cam surface configured for sliding contact with a force receiving portion directly or indirectly coupled with the movable locking member. The cam surface can be configured such that a force exerted on the force receiving portion is directed such that the movable locking member is urged towards a positive locking position. Stated differently, the cam surface which may also be referred to as locking surface may function in the manner of a wedge and can be configured in a wedge like manner. Accordingly, play in the system between the mounting portion and the locking members which for example may result from vibrations can be prevented. In this way, it is ensured that the mounting portion can only become tighter tensioned and cannot loosen. In a possible configuration of the cam surface, the distance of the cam surface from a rotational centre of the blocking member can be smaller on a section of the cam surface contacting the movable locking member first than on a surface section which contacts the movable locking member when the blocking member is further rotated in engaging direction. Thus, the distance from the rotational centre to the cam surface section that makes contact with the movable locking member increases with a rotation of the blocking member in engaging direction. According to a preferable configuration, the latter described distance can vary in a range from 2 mm to 5 mm, preferably from 2 mm to 4 mm. Preferably, the latter described distance is substantially 3 mm or exactly 3 mm.

According to a further preferable embodiment, the supporting unit may further comprise an operating lever for at least returning the blocking member into the unlocking position. Thus, the operating lever may also be referred to as release lever. Accordingly, a locking state of the supporting unit can be released by operating the operating lever. Thus, the supporting unit can be configured such that the operating lever is only used to disengage the blocking member from a movable locking member so as to allow a movement of the movable locking member.

According to a further preferable embodiment, the supporting unit may further comprise a cross bar attachment member for coupling the supporting unit to a crossbar of a load carrier. Preferably, an operating member for operating the crossbar attachment member is also provided, wherein more preferably the operating member is arranged below or behind the operating lever for returning the blocking member into the unlocking position. In this way, the operating member for operating the crossbar attachment member can be hidden or at least partially hidden below the operating lever.

According to a further preferable embodiment, at least one movable locking member is arranged on the supporting unit movable towards and away from a positive locking position. The movable locking member can be arranged translatory movable. For example, the movable locking member can be slidably translatory movable on the support unit. According to an embodiment, the at least one movable locking member is arranged pivotably movable about a pivot axis. The at least one movable locking member can be configured and arranged pivotable about the pivot axis such that the movable locking member is pivoted by the force exerted by the mounting portion. Preferably, the at least one movable locking member is configured such that force resulting from the bike's own weight is enough for pivoting the movable locking member towards the positive locking position. On the other hand, it may also be translatory and/or slidingly movable along a path which is oriented in a descending manner towards the positive locking position such that the force received from the mounting portion in vertical downward direction is at least partially transferred into a pushing force towards the positive locking position.

According to a further preferable embodiment, at least one of the receiving sections can comprise a shape at least partially following an outer contour of the mounting portion and/or an at least partially curved shape which is preferably curved such that it is half circularly formed in cross section. The receiving sections can be configured to provide a three-point locking or clamping of an inserted mounting portion. For example, the supporting unit can comprise a stationary locking member and a movable locking member both cooperating for clamping a mounting portion, preferably an axle type mounting portion or mounting aid. Of the three-point locking or clamping, two contact points or sections may be provided on the stationary locking member and one point or section may be provided on the movable locking member. The stationary locking member can be configured in the manner of a lying U-shape in which the open portion faces the movable locking member. An upper or top inner surface portion can be inclined downwards with respect to a horizontal plane towards the open side of the U-shape, preferably by an angle of substantially 5 degrees. This inclined surface portion can form one of the above-mentioned locking points of the three point locking. In this way, it is prevented that the mounting portion held by the locking members forces the movable locking member to move backwards, i.e. in opening direction, when a bike mounted on the supporting unit is swaying from side to side during transport. Another surface portion on the stationary locking member which may be located on the receiving portion of the stationary member at a substantially opposite position to the latter inclined surface portion may be referred to as lower inner surface portion and may be inclined in the same direction as the top inner surface portion but with a greater angle, preferably an angle of substantially 25 degrees which even further prevents that the mounting portion is forced to move backwards when the bike is swaying from side to side during transport. A third point may be provided on the movable locking member, for example on a substantially vertically extending wall portion of the movable locking member.

According to a further preferable embodiment, the mounting portion comprises an axle. The axle can be a thru axle of the bike for mounting a wheel to the fork. The axle can also be a thru axle adapter axle which is configured to be coupled to the fork by means of the thru axle of the fork. The axle can further be a quick release adapter axle which is configured to be coupled to the fork by means of a quick release skewer mechanism.

According to a further preferable embodiment, a bike carrier comprising a supporting unit as described before and a supporting bar coupled to the supporting unit and configured to directly or indirectly support a rear wheel of a bike is provided.

Furthermore, a method of mounting a mounting portion provided on a bike on a supporting unit as descried before is provided. The method comprises the steps: Inserting the mounting portion in a receiving section of a movable locking member of a locking mechanism, and moving the mounting portion into a stationary locking member thereby moving the movable locking member into a locking position in which a movement of the movable locking member in an opening direction is automatically blocked. Optionally, the method may comprise the step of providing a mounting portion on the fork of a bike prior to inserting the mounting portion in the receiving section. In a preferable embodiment, the mounting portion which is provided on or mounted to the fork is put down into the supporting unit and a user then pushes the bike in engaging direction, preferably in forward direction, which makes the movable locking member to slide into a stationary clamping member and a spring loaded blocking member, for example a catch, falls down behind the movable locking member which prevents the movable locking member from moving backwards. In this way, the mounting portion is held in positive locking manner, preferably clamped, between the movable locking member and a stationary locking member.

Dismounting may be achieved by the steps operating the release lever, preferably by pushing down the release lever, in order to return the blocking member into an unlocking state or unlocking position. This enables the movable mounting portion to be moved towards the open position. According to a configuration, a user may pull the movable locking member back while holding the release lever down. The movable locking member may according to a preferable configuration slide beneath the blocking member. As soon as the movable locking member is beneath the blocking member, the user may let go of the release lever and the blocking member may go down on top of the movable blocking member. According to this preferably configuration, the bike may now be removed from the supporting unit and the supporting unit is in a condition ready for locking a mounting portion thereon.

In case a pivotably movable locking member is provided, the above mounting steps differ from the described ones in that the movable locking member rotates when the user pushes the bike forward or pulls the bike backward. Locking is likewise achieve by a blocking member as described above.

According to a second aspect, a supporting unit for a bike carrier is provided. The supporting unit can be configured for fixedly holding and/or clamping a mounting portion mountable to the fork of a bike instead of a wheel or being formed by a part other than the wheel of the bike to be transported, for example by a portion of the fork of the bike. In particular, the supporting unit can be configured as described with respect to other aspects and can optionally comprise the features according the second aspect in addition. Furthermore, it is to be noted that the supporting unit and other features of the second aspect may comprise the features of a supporting unit described in connection with another aspect. The supporting unit comprises a guiding arrangement adapted to receive the mounting portion in a first direction cross to a longitudinal direction of the supporting unit and to guide the mounting portion in a second direction different to the first direction during insertion of the mounting portion such that the mounting portion is shifted to a desired fixation position on the supporting unit at least in a direction cross to the longitudinal direction of the supporting unit upon inserting the same.

According to a preferable embodiment, the guiding arrangement comprises a guiding portion configured to cooperate with a guiding portion of the mounting portion.

According to a further preferable embodiment, the guiding portion comprises a guiding recess having a width that narrows towards the fixation position. The guiding recess can be preferably formed at least partially funnel shaped. Preferably, the guiding recess can be formed with tapered walls at least in an insertion section of the guiding recess. With such a configuration, it is possible to provide a centering guiding portion in which the centering effect is achieved by providing a path which comprises a wider portion for insertion purposes which narrows towards the desired position.

According to a further preferable embodiment, the guiding portion comprises a guiding protrusion. The guiding protrusion can be a guiding rib. In particular, the guiding protrusion can be a guiding rib which is arranged in the centre of the supporting unit and extends in longitudinal direction of the supporting unit or parallel thereto. The guiding rib can be configured to be accommodated in the guiding portion of the mounting portion. The guiding portion of the mounting portion can be provided with an accommodating recess preferably formed in the mounting portion in a funnel shape like manner. The recess can preferably be formed by tapered walls and/or preferably have a width that widens towards a distal end of the mounting portion. For example, if the mounting portion is configured as a cylindrical part which is to be accommodated in the supporting unit, the recess can be provided in a wedge-like manner extending from an outer circumference of the cylindrical part towards its centre.

According to a further preferable embodiment, the mounting portion can comprise an axle. The axle can be a thru axle adapter axle which is configured to be coupled to the fork by means of a thru axle of the fork. The axle may also be a quick release adapter axle which is configured to be coupled to the fork by means of a quick release skewer mechanism. Accordingly, it is preferable if the mounting portion is mountable to the fork of the bike prior to mounting the bike on the bike carrier so that the mounting portion is provided or mounted on the fork before inserting the same in the supporting unit.

According to a further preferable embodiment, a mounting aid fixable to the fork of a bike is provided. The mounting aid can in particular be configured to cooperate with the before described supporting unit. The mounting aid can be configured to function as an interface between the fork and a bike carrier for fixedly mounting the fork to the bike carrier. The mounting aid can comprise a main portion, preferably a sleeve shaped main portion, wherein the main portion can comprise a guiding portion configured to cooperate with the guiding arrangement of the supporting unit during insertion of the mounting aid in the supporting unit such that the mounting aid is shifted to a desired fixation position on the supporting unit at least in a direction cross to the longitudinal direction of the supporting unit upon inserting the mounting aid.

According to a further preferable embodiment, the guiding portion may comprise a protrusion provided on an outer circumference of the main portion. The protrusion can be configured to be accommodated in a guiding recess provided in the guiding arrangement of the supporting unit. The protrusion can preferably be configured to extend at least partially, but preferably fully, about the outer circumference of the main portion. Preferably, the protrusion extends at least partially in a plane which extends cross to a longitudinal direction of the main portion. Preferably, the protrusion extends perpendicular to the longitudinal direction of the main portion and/or extends through a middle section of the main portion, preferably through the longitudinal centre of the main portion.

According to a further preferable embodiment, the main portion is configured to receive inserts at its longitudinal ends wherein the inserts may be adapted to the dimensions of the fork to be mounted on the bike carrier.

According to a further aspect, a mounting aid fixable to the fork of a bike is provided. The mounting aid may be configured to function as an interface between the fork and a bike carrier for fixedly mounting the fork to the bike carrier. The mounting aid may comprise a sleeve-shaped main portion configured to receive inserts at its longitudinal ends. The inserts can be adapted to the dimensions of the fork to be mounted on the bike carrier.

According to a preferable embodiment, at least one of the longitudinal ends is configured to receive the insert in a direction cross to the longitudinal direction of the main portion. Preferably, the main portion comprises a guiding portion adapted to slidably receive the insert. The guiding portion can comprise a recess and/or a protrusion extending perpendicular or skew to a longitudinal axis of the main portion and can be configured for a slidable engagement with the insert.

According to a further preferable embodiment, at least one of the longitudinal ends is configured to receive the insert by at least partially rotating the insert relative to the main portion, preferably by screwing the insert into the longitudinal end or by fixing the insert to the longitudinal end by means of a bayonet coupling.

According to a further preferable embodiment, at least one of the longitudinal ends is configured to receive the insert by pressing the insert on the longitudinal end and/or wherein at least one of the longitudinal ends is configured to snap fittingly or friction fittingly receive the insert and/or wherein the mounting portion preferably comprises a catch, preferably pre-biased in locking direction, the catch being preferably configured to engage with the insert, preferably with a recess provided on the insert.

According to a further preferable embodiment, the sleeve-shaped main portion can comprise a guiding portion configured to cooperate with a guiding arrangement of a supporting unit during insertion of the mounting aid in the supporting unit such that the mounting aid is shifted to a desired fixation position on the supporting unit at least in a direction cross to the longitudinal direction of the supporting unit upon inserting the mounting aid.

According to a preferable embodiment, the guiding portion comprises a protrusion provided on an outer circumference of the main portion. The protrusion can be configured to be accommodated in a guiding recess provided in the guiding arrangement of the supporting unit, for example in a guiding arrangement as described before. The protrusion can be configured to extend at least partially, preferably fully, about the outer circumference of the main portion. The protrusion can preferably extend at least partially in a plane which extends cross to a longitudinal direction of the main portion and preferably extends perpendicular to the longitudinal direction of the main portion and/or extends through a middle section of the main portion, preferably through the middle centre of the main portion.

According to a further aspect, an insert for adapting a mounting aid to a fork of a bike is provided. The insert can comprise a coupling portion to be inserted on the mounting aid as described before. The coupling portion can be configured to enter into a longitudinal end of the mounting aid or can be configured to slide on the longitudinal end.

According to a preferable embodiment, the coupling portion comprises a recess for accommodating an engaging portion of a catch for establishing a snap fit connection in the mounting aid. The catch may be a spring provided in a recess formed in the main portion. The recess in the main portion may be a cut into the main portion with a depth such that it interferes with an interior space of the main portion. Thus, when in locking position, the catch protrudes into the interior space of the main portion allowing an engagement with a coupling portion of an insert. The catch can be pre-biased towards the locking position and, thus, can have to be pushed away upon inserting an insert. For that, the insert, preferably the coupling portion, may comprise a conical end thereby providing a sliding surface pushing the catch outwards, preferably outwards in radial direction of the insert, when the insert is inserted in the main portion, and may snap into the recess in the coupling portion when the insert is further inserted up to a locking position in which the catch and the recess are aligned.

According to a further preferable embodiment, the coupling portion comprises a threaded portion engageable with a threaded portion of the longitudinal end or a recessed portion in which an O-ring is accommodated.

According to a further preferable embodiment, the coupling portion can be configured such that the insert is insertable on the longitudinal end in a direction cross to the longitudinal direction of the insert and preferably comprises a guiding section adapted to be slidably moved on the longitudinal end.

According to a further preferable embodiment, a mounting system is provided comprising a mounting aid as described before and an insert as described before. By combining differently shaped inserts which are tailored to the dimensions of different forks of bikes, it is possible to provide a modular mounting system with a main portion which can be used for all of the different fork types. On the other hand, it is possible to adapt the mounting system to the different fork types by fixing suitable inserts on the main portion.

According to a further aspect, a mounting aid fixable to the fork of a bike is provided. Again, the mounting aid is configured to function as an interface between the fork and a bike carrier for fixedly mounting the fork to the bike carrier. The mounting aid comprises an elongated main portion and a quick release skewer type clamping mechanism configured to simultaneously clamp each end portion of the fork between a movable clamping member and the main portion. Preferably, each movable clamping member is configured for a direct contact with a respective end portion of the fork and can be arranged so as to be movable with respect to the main portion in a non-rotatable but axially movable manner.

According to a preferable embodiment, each movable clamping member can comprise an elongated support portion. The elongated support portion can be a shaft or a hollow shaft. The elongated support portion can be slidably accommodated in a support opening of the main portion. The elongated support portion and the support opening preferably comprise at least partially non-round cross sectional outer and inner contours, respectively. Accordingly, the movable clamping members are locked in rotation with respect to the main portion thanks to a non-uniform cross section. Locking the rotation of the movable clamping members means that all elements clamping on the bike fork legs are moving linearly and are not transmitting any rotational force to the fork legs. This in turn means less risk of damaging the bike and more controlled friction in the system ensuring a more stable clamping force. Optionally or in addition, the cooperating non-round cross sectional contours can be provided between the shaft and the movable clamping member and/or between the movable clamping member and the main portion. In addition or optionally, the support portion comprises a flat surface section and the support opening comprises a correspondingly shaped flat inner surface section which are preferably arranged in sliding contact with each other thereby preventing a rotation of the movable clamping member.

According to a preferable embodiment, each movable clamping member can comprise a force application portion and the main portion can comprise clamping portions each configured for supporting an end portion of the fork of the bike when a force is applied on the end portion by the force application portion.

According to a further preferable embodiment, a first movable clamping member of the movable clamping members comprises a coupling section for coupling the first movable clamping member to a force application member. The coupling section can be a threaded portion provided on the shaft. The force application member can be a force application member for applying a pulling force on the first movable clamping member. The first movable clamping member can be configured and arranged in the main portion such that the coupling section and the force application portion are arranged on opposite sides of the main portion.

According to a further preferable embodiment, a second movable clamping member of the movable clamping members can be partially and slidably held in the main portion between a portion of the shaft, preferably at least partially including the threaded portion of the shaft when the mounting aid is in an open state, and the main portion such that the second movable clamping member is slidably held in the opening and the shaft of the first movable clamping member is slidably held in the second movable clamping member, in particular in a hollow shaft portion of the second movable clamping member.

According to a further preferable embodiment, the mounting aid further comprises a balancing system. The balancing system is preferably provided, e.g. housed in the main portion. The balancing system can comprise urging members, preferably springs. The urging members can be coupled to the movable clamping member such that the movable clamping members are pre-biased towards an open position. The main portion can comprise a centre inner wall extending perpendicular to the longitudinal direction of the main portion. The urging members can be provided on opposite sides of the centre inner wall with one end of the urging members, preferably springs, arranged on the centre inner wall and the other end being connected to the movable clamping members, respectively, for example via circlips or similar means. The main portion may be provided with press fit endings comprising the support openings and securing the balancing system. These end fittings may be configured to prevent the movable clamping members from coming off of the main portion. The urging members are preferably configured so as to apply substantially the same urging force on the movable clamping members.

According to a further preferable embodiment, the mounting aid further comprises an operating unit configured to be operated by a user and configured to transfer an operating force on the movable clamping members. The operating unit is preferably configured to transfer the operating force on one of the movable clamping members by means of an urging member. The urging member is preferably a spring pack comprising preferably one or more spring washers such as Belleville washers, such that a preferably strong bias is generated when the movable clamping members are in a closed position in order to absorb any movement of the movable members during use of the mounting aid so that a sufficient clamping force can be securely maintained during use of the mounting aid. The urging member is provided in line with the operating force in order to compensate for a reduction in clamping force that might occur with time as some materials and components may settle slightly.

According to a further preferable embodiment, the operating unit preferably comprises an operating member. The operating member can be a knob or an eccentric lever. In addition or alternatively, the operating unit can be configured to apply a pushing force on the second movable clamping member and can be preferably configured to apply a pulling force on the first movable clamping member.

According to a further preferable embodiment, the operating unit can comprise a force application member threadedly engaged with a threaded portion of the first movable clamping member and force transmittingly coupled to the second movable clamping member by means of the urging member such that an operation of the operating unit urges the first movable clamping member and the second movable clamping member in opposite directions.

According to a further preferable embodiment, the force application member is arranged coaxially with the movable clamping members and comprises a force application portion configured to apply a force on the urging member. The force application portion can be a flange protruding in a radial direction of the force application member. The force application portion can be preferably configured to receive a torque from the operating unit. Preferably, the operating unit comprises a torque limiting mechanism and the force application portion is preferably configured to receive a torque from the torque limiting mechanism. The torque limiting mechanism preferably comprises a force application member with a force application section configured to apply the torque on the force application portion and preferably with a housing section defining an accommodating space for at least partially accommodating the urging member and preferably configured to partially accommodate a force receiving portion of the second movable clamping member so that the urging member and the force application portion are arranged between the force receiving portion and the force application section of the force application member.

Other features of the present invention will be apparent from consideration of the information contained above as well as in or in combination with the following detailed description, drawings and claims and configurations given in itemized structure below. The present invention is illustrated by way of example, and not by way of limitation, in the Figures of the accompanying drawings.

BRIEF DESCRIPTION OF THE DRAWINGS

The accompanying drawings, which are incorporated herein and form part of the specification, illustrate embodiments and, together with the description, further serve to explain the principles of the embodiments and to enable a person skilled in the art to make and use the embodiments. It is noted that the same or similar parts in the different figures are denoted by the same reference signs.

FIG. 10 shows a side view of a blocking member of a locking mechanism according to an embodiment.

FIG. 11 shows a perspective view of the blocking member of FIG. 10.

FIG. 12 shows a side view of a stationary locking member of the locking mechanism according to an embodiment.

Figure 1:
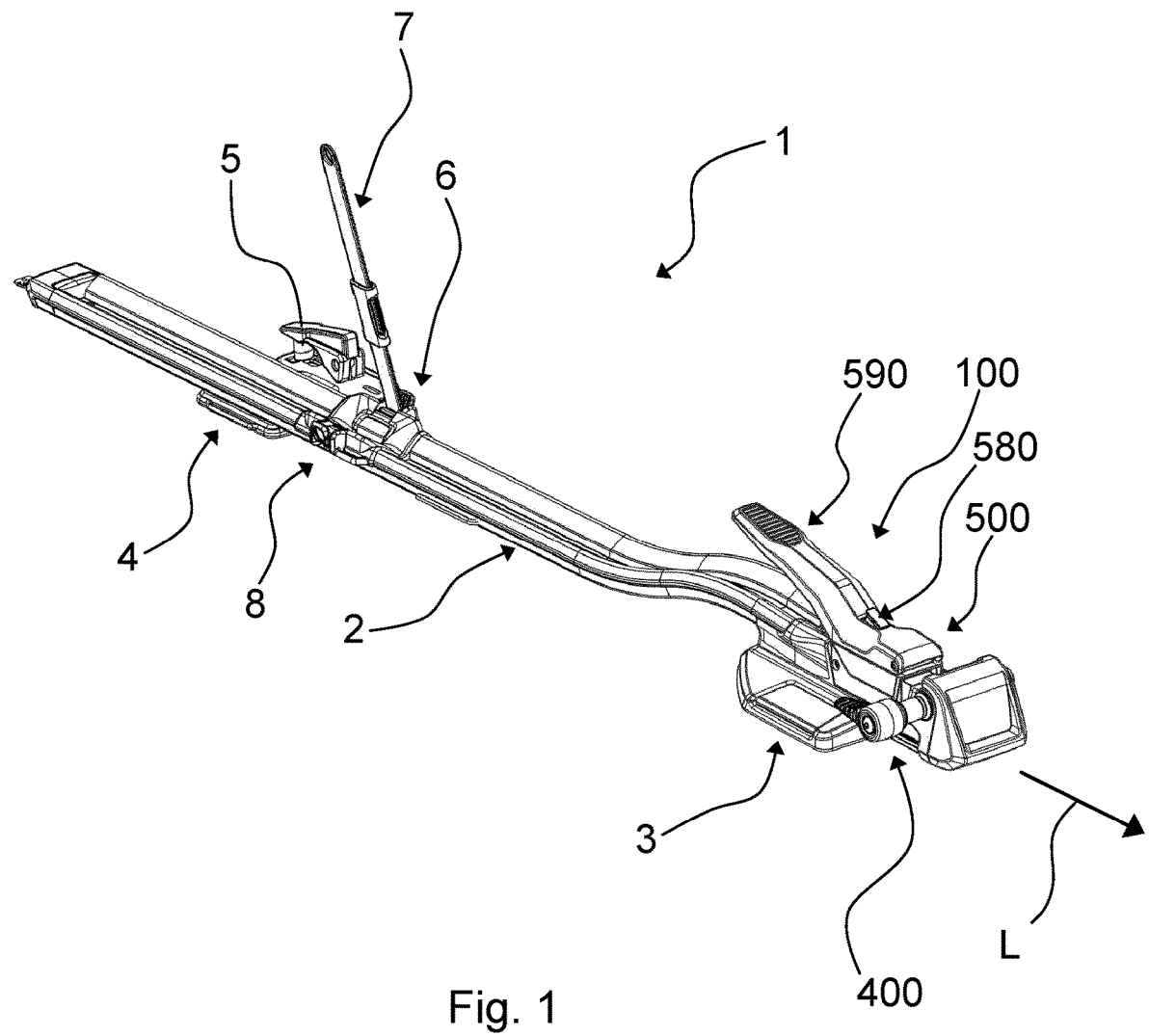
FIG. 1 is a perspective view of a bike carrier according to an embodiment.

The features and advantages of the embodiments will become more apparent from the detailed description as given below when taken in conjunction with the drawings, in which like reference signs identify corresponding elements throughout. In the drawings like reference numbers generally indicate identical, functionally similar and/or structurally similar elements.

DETAILED DESCRIPTION OF EMBODIMENTS

Embodiments of the present disclosure are described in detail with reference to embodiments thereof as illustrated in the accompanying drawings. It is noted that when a particular feature, structure or characteristic is described in connection with an embodiment, it is submitted that it is within the knowledge of one skilled in the art to effect such feature, structure, or characteristic in connection with other embodiments, modifications or aspects whether or not explicitly described.

The following examples are illustrative, but not limiting, of the present embodiments. Other suitable modifications and adaptations of the variety of conditions and parameters normally encountered in the field, and which would be apparent to those skilled in the art, are within the scope of the disclosure.

FIG. 1 shows a perspective view of a bike carrier 1 according to an embodiment. The bike carrier 1 comprises a supporting unit 100 for supporting the fork of a bike to be transported. In particular, the supporting unit 100 is configured to couple the fork of a bike to the bike carrier.

The bike carrier 1 may comprise an elongate supporting profile 2. Furthermore, the bike carrier 1 can comprise a front supporting portion 3 which is configured to support the bike carrier 1 on a front cross bar of a load carrier of a vehicle. The front supporting portion 3 can be integrally formed with the supporting unit 100. The bike carrier 1 may further comprise a rear supporting portion 4 which is configured to support the bike carrier 1 on a rear cross bar of a load carrier of a vehicle. The rear supporting portion 4 comprises an operating member 5 for clamping the rear supporting portion 4 on the cross bar. The bike carrier 1 further comprises a wheel fixation portion 6 which is configured to receive and secure the rear wheel of a bike to be transported. The wheel fixation portion may comprise a strap, preferably a toothed strap, and a strap receiver 8 in which a free end of the strap 7 can be inserted and secured in order to form a fixation loop for the rear wheel of the bike. The rear supporting portion 4 and the wheel fixation portion 6 may be slidably arranged on the elongate supporting profile 2 in order to adapt the bike carrier 1 to the bike size and to the distance of cross bars of a load carrier on which the bike carrier 1 is to be mounted, respectively.

Figure 2:
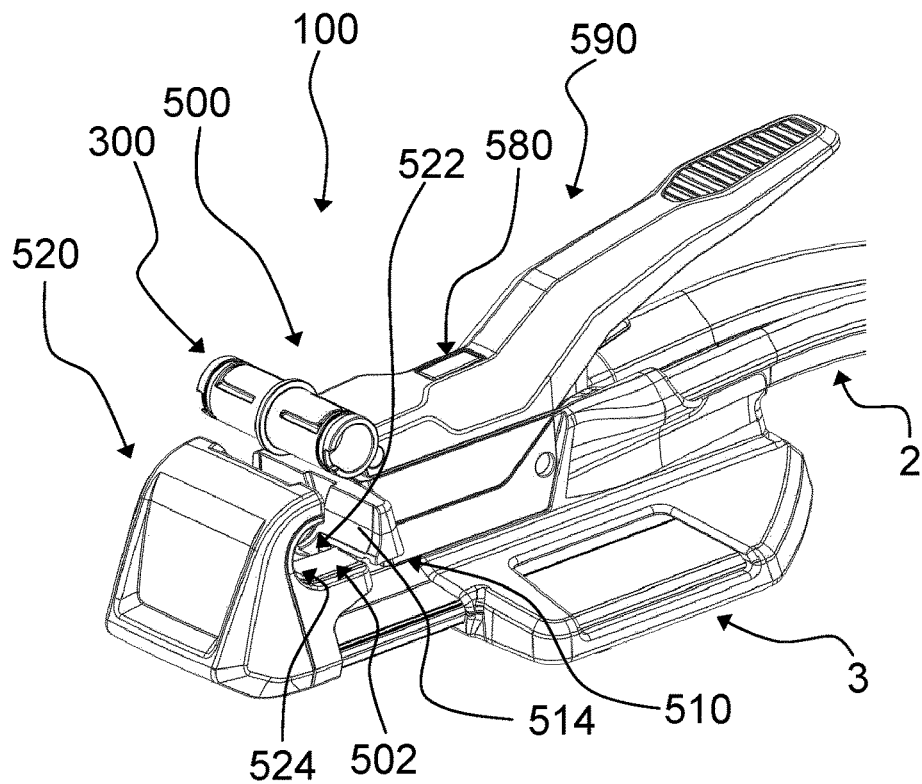
FIG. 2 shows an enlarged perspective view of a supporting unit according to an embodiment of the bike carrier of FIG. 1.

The supporting unit 100 is configured to securely fix mounting aids or mounting portions of different types on the same. In FIG. 1, a mounting aid 400 comprising a quick release type clamping mechanism is fixedly held in the supporting unit 100. However, it is to be noted that other types of mounting aids can be used in connection with the supporting unit 100. For example, FIG. 2 shows the supporting unit 100 of FIG. 1 in connection with a mounting aid 300 which is configured for the fixation of a thru axle type fork on the supporting unit 100. The different types of mounting aids usable in connection with the supporting unit 100 according to the embodiment will be described in greater detail below. However, the function of the supporting unit and their components will be described first as the supporting unit 100 is usable with all of the mounting aids disclosed herein.

Figure 3:
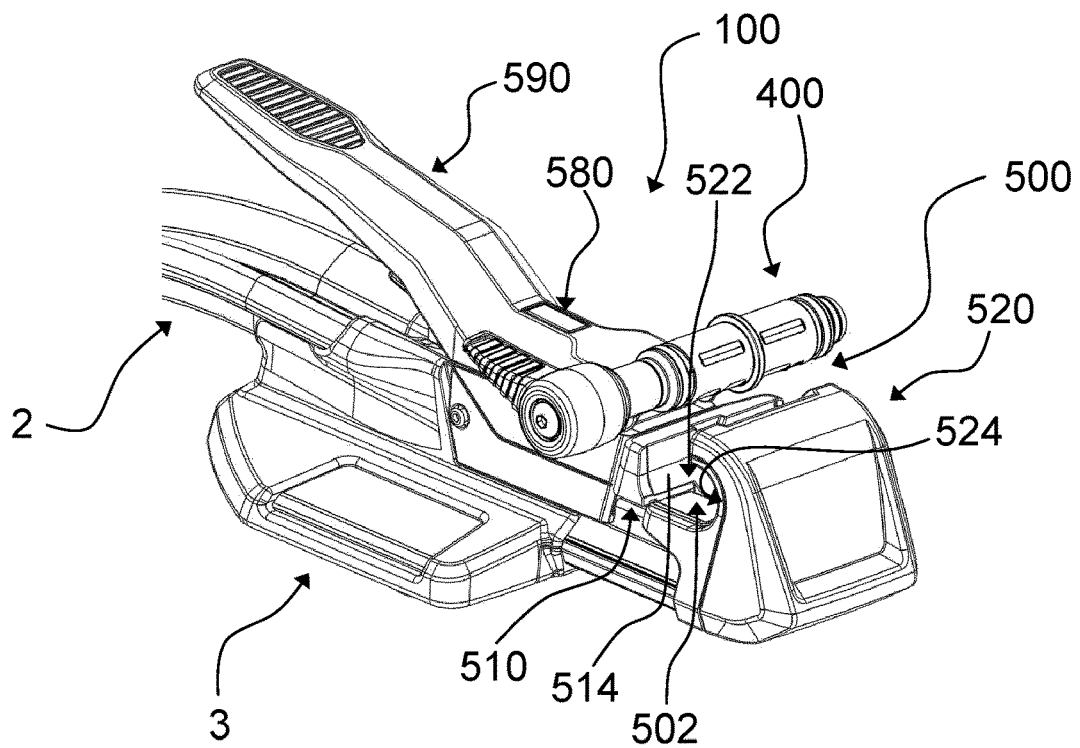
FIG. 3 shows a further perspective view of the submit of FIG. 2.

FIGS. 2 and 3 show perspective views of the supporting unit 100 according to an embodiment which is coupled to a front end of the elongate supporting profile 2. As is shown in FIGS. 1 to 3, the supporting unit 100 comprises a locking mechanism 500 for securing the mounting aids 300, 400 on the bike carrier. The locking mechanism 500 comprises a movable locking member 510 and a fixed or stationary locking member 520. An accommodating space 502 is provided between and limited by the movable locking member 510 and the stationary locking member 520.

The movable locking member 510 is movable towards and away from the stationary locking member 520. By moving the movable locking member 510 towards the stationary locking member 520, the accommodating space 502 is reduced in size such that a mounting aid 300, 400 provided therein can be securely enclosed by the movable locking member 510 and the stationary locking member 520 in order to at least provide a positive locking coupling between the mounting aid 300, 400 and the supporting unit. Preferably, the mounting aid 300, 400 is clamped between the movable locking member 510 and the stationary locking member 520. The movable locking member 510 according to the embodiment comprises a clamping section 514 which is defined by a surface making contact with the mounting aid 300, 400 and being available for exerting a pushing force on the mounting aid 300, 400. In the configuration as shown in FIGS. 2 and 3, the clamping section 514 is defined by a curved surface being configured to at least partially follow an outer contour of the mounting aid 300, 400. In this way, a surface contact between the mounting aid 300, 400 and the movable locking member 510 can be achieved.

The stationary locking member 520 comprises a receiving section 522 which in turn comprises a clamping section 524. In the present configuration, the receiving section 524 comprises a lying, i.e. horizontally extending, U-shape when viewed from the side wherein an open end of the U-shape is oriented towards the movable locking member 510. The stationary locking member 520 comprises a clamping section 524 which is formed by a curved surface of the receiving section 522. The receiving section 522 is configured according to the dimensions of the mounting aid 300, 400 to be used and is in particular configured to accommodate the mounting aid 300, 400 therein. Thus, according to the embodiment, the mounting aid 300, 400 can be clamped between the movable locking member 510 and the stationary locking member 520.

The locking mechanism 500 according to the present embodiment is actuated or operated by the insertion and movement of the mounting aid 300, 400. In other words, the locking mechanism 500 is designed to automatically lock the mounting aid 300, 400 therein without a further operation by a user. In order to release the mounting aid 300, 400 and to allow a dismounting of the mounting aid 300, 400, the locking mechanism comprises a lever 590. By pushing down the lever 590, the locking mechanism is brought into a release state which allows to move the movable locking member 510 in an opening direction, that is in a direction away from the stationary locking member 520. In order to indicate the current state of the locking mechanism, in particular a locking state, the locking mechanism 500 may comprise an indicator 580 as shown in FIGS. 1 to 3. This optional indicator 580 will be described below in greater detail but it is already visible from FIGS. 1 to 3 that in the indicator 580 is movable between a deployed position as shown in FIG. 1 and a retracted position as shown in FIGS. 2 and 3, for example. In the present embodiment, the deployed position indicates that the movable locking member 510 is locked and the mounting portion 300, 400 is correctly mounted, and the retracted position indicates that the movable locking member 510 is at least not correctly locked in the locking mechanism 500 but a vice versa indication would also be possible.

Figure 4:
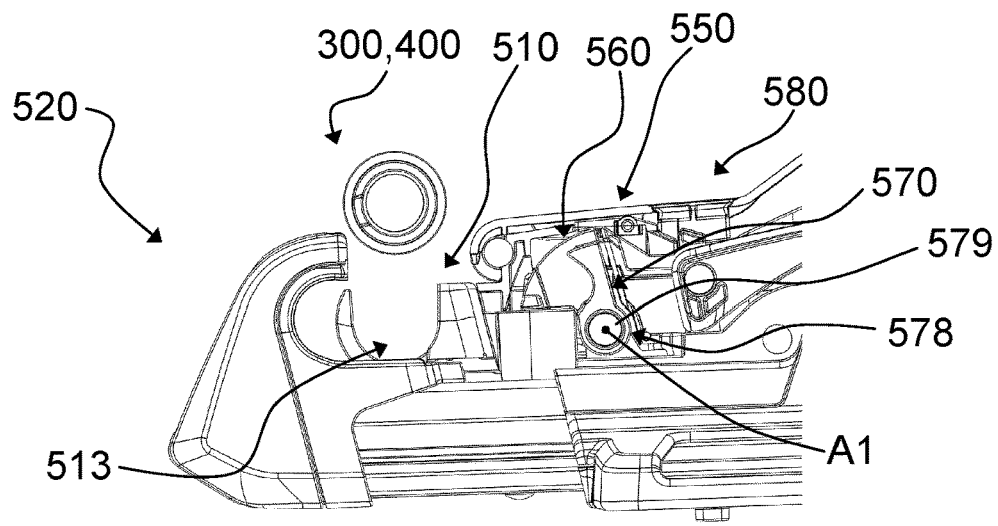
FIGS. 4 to 8 show side views of the supporting unit of FIG. 2 showing a mounting process of a mounting member in the supporting unit as well as the function of a locking mechanism of the supporting unit according to an embodiment.
Figure 5:
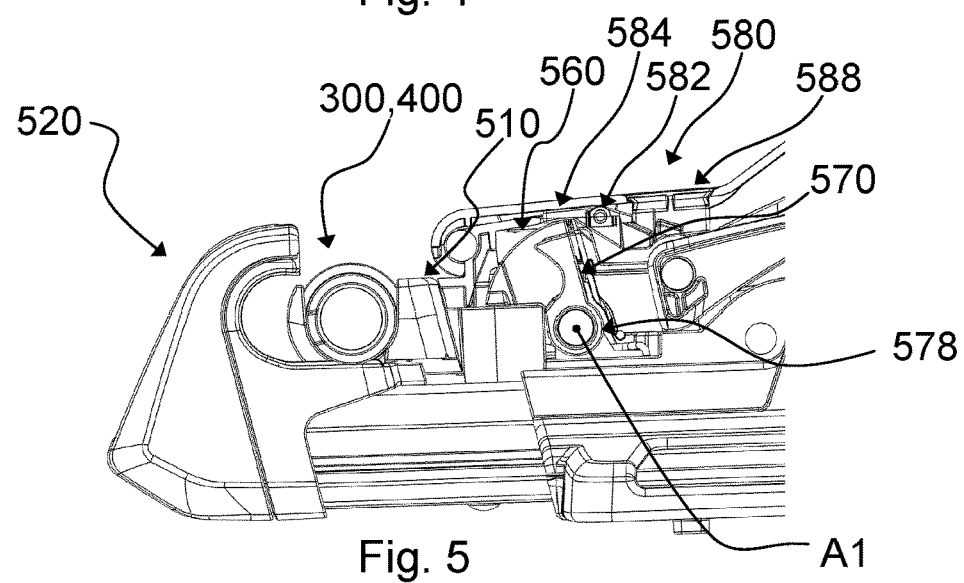
Figure 6:
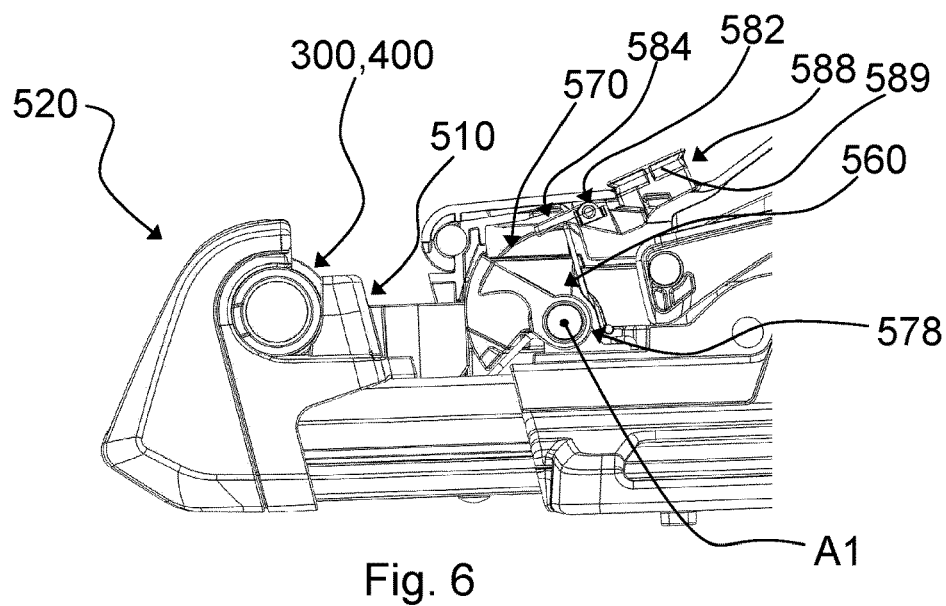
Figure 7:
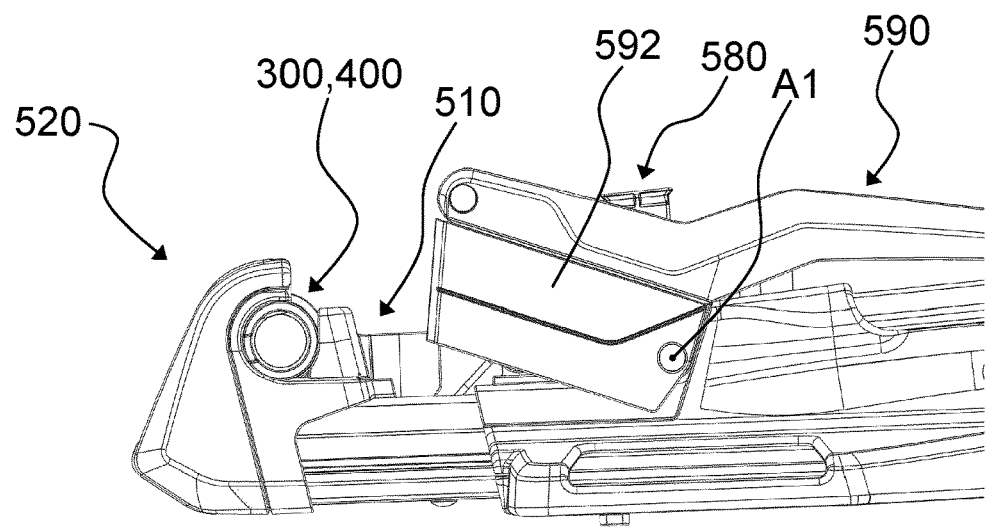
Figure 8:
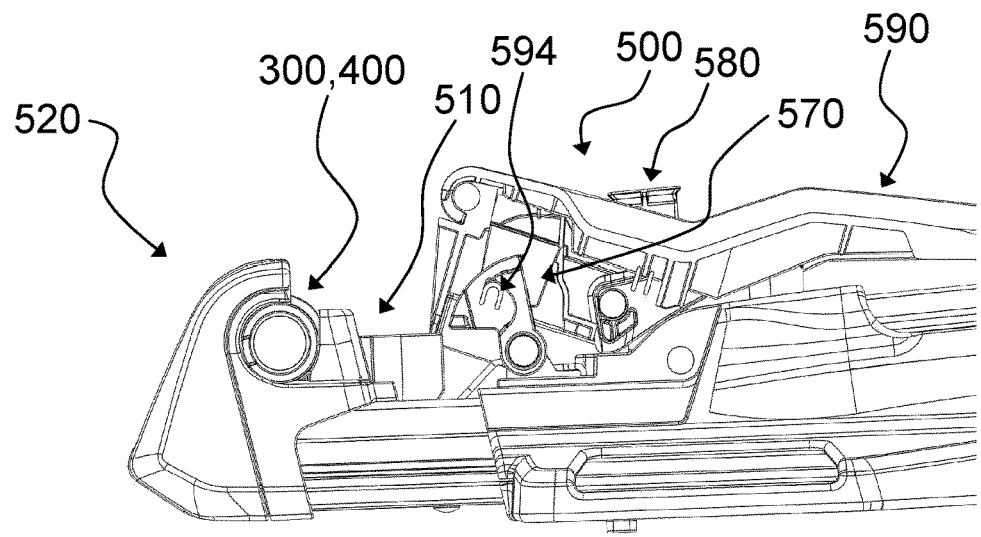

A general function of the locking mechanism 500 will be described in greater detail with reference to FIGS. 4 to 14. FIGS. 4 to 6 also show a process of mounting a mounting portion on the supporting unit 100. FIGS. 7 and 8 show a dismounting process of the mounting portion 300. FIGS. 9 to 14 show further details of the locking mechanism 500. It is to be noted that other mounting portions than the mounting aid 300 as shown in FIGS. 4 to 8 may be used in connection with the locking mechanism 500 as long as they are able to cooperate with the supporting unit. Therefore, the terms mounting aid and mounting portion are both used to describe elements that are able to cooperate with the supporting unit.

The locking members 510, 520 are configured to positively lock the mounting portion 300, 400, which may be the mounting aid 300, 400, on the supporting unit. For that, the locking mechanism comprises an arrangement with at least two locking members 510, 520. As already mentioned above, one locking member 510 is arranged movable with respect to the other locking member 520. Furthermore, both locking members are configured to jointly form an accommodating space in which the mounting portion 300, 400 is securely held and may not come off from the supporting unit when the movable locking member is in a positive locking position. In other words, if the movable clamping member is in the positive locking position, the mounting portion is accommodated with positive locking such that a form fit coupling between supporting unit 100 and mounting portion 300, 400 is achieved.

Figure 13:
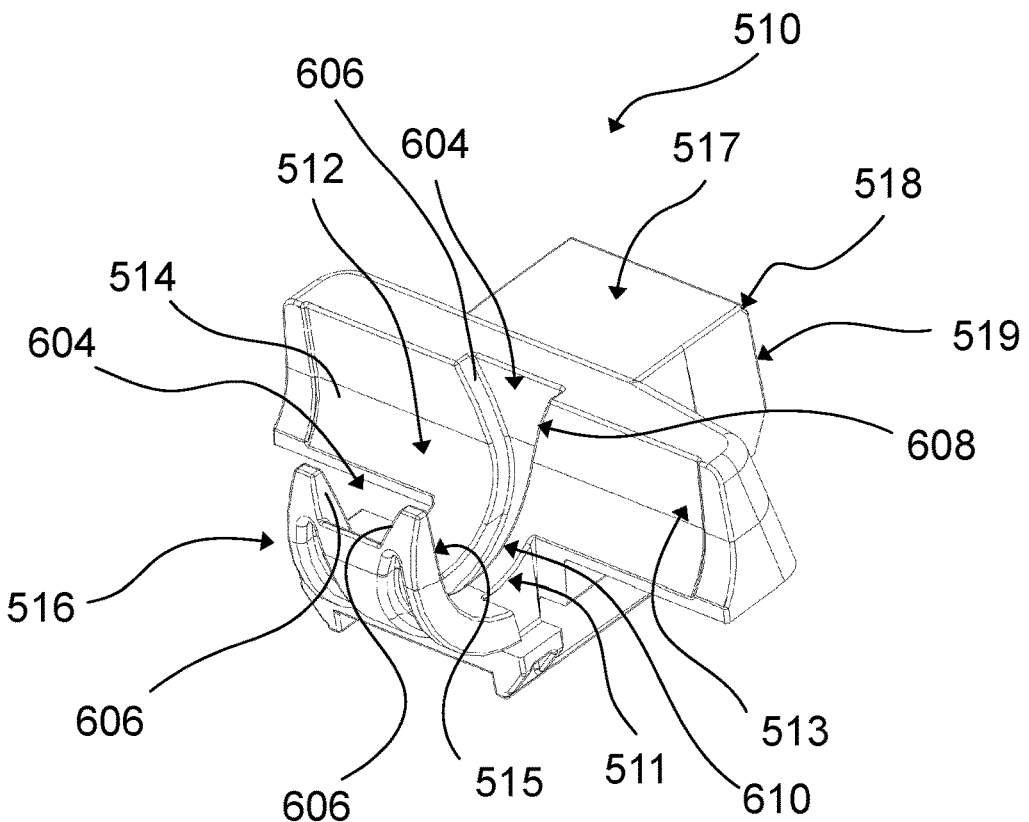
FIG. 13 shows a perspective view of a movable locking member of the locking mechanism according to an embodiment.

The movable locking member 510 according to an embodiment is shown in FIG. 13. In FIG. 13, the movable locking member 510 is shown in perspective view and comprises a receiving section 512 which is configured to accommodate the mounting portion 300, 400 therein. When viewed from the side, the receiving section 512 comprises a U-shape which may be configured such that a base portion of the U-shape substantially follows an outer contour of the mounting portion 300, 400, so that the mounting portion 300, 400 can be supported on the base portion by a surface contact between the mounting portion 300, 400 and the movable clamping member 510. On opposite sides of the base portion, walls extending in upward direction limit the receiving section 512. The surfaces of these walls which are oriented inwards into the U-shape are preferably oriented towards each other for forming side walls of the receiving section 512. The base portion of the U-shape is marked with reference sign 511 in FIG. 13 and the side walls are marked with reference signs 513 and 515, respectively. The side wall 513 is oriented towards the stationary locking member 520 when the movable locking member 510 is arranged in the supporting unit 100 as is shown in FIG. 4. At least a portion of the side wall 513 forms a clamping section 514 which, according to a preferable configuration, can exert a pushing force on the mounting portion 300, 400 when the movable locking member 510 is in a positive locking position. In this way, the mounting portion 300, 400 can be clamped between the movable locking member 510 and the stationary locking member 520.

The side wall 515 which is arranged on the opposite side of the base portion 511 of the U-shaped receiving section 512 is configured as a force receiving portion or engaging portion 516. The engaging portion 516 may comprise a shape different to the one described in connection with the present embodiment. The general function of the engaging portion 516 is the ability to receive a force from the mounting portion 300, 400 such that the movable locking member 510 is taken with the mounting portion 300, 400 when the same is moved towards the stationary locking member 520 by a force exerted thereon by a mounting portion. In this way, the movable locking member 510 can be brought into the positive locking position merely by being pushed by the mounting portion 300, 400 towards the stationary locking member 520. In this connection, the stationary locking member 520 may comprise an accommodating recess 526 which is configured to receive the engaging portion 516 of the movable locking member 510 when the movable locking member 510 is in the positive locking position.

The stationary locking member 520 may further comprise a clamping section 524 which is defined by a wall surface which is oriented towards the clamping section 514 provided on the movable locking member 510. The clamping section 524 is configured to at least partially get in surface contact with the mounting portion 300, 400, so that it is possible to fixedly hold the mounting portion 300, 400 between the clamping section 514 of the movable locking member 510 and the clamping section 524 of the stationary locking member 520. The portion of the stationary locking member 520 which is configured to at least partially accommodate the mounting portion 300, 400 may also be referred to as receiving section 522. As already mentioned before, this receiving section 522 is not only configured to at least partially receive the mounting portion 300, 400 but also configured to receive the engaging portion 516 of the movable locking member 510.

Figure 14:
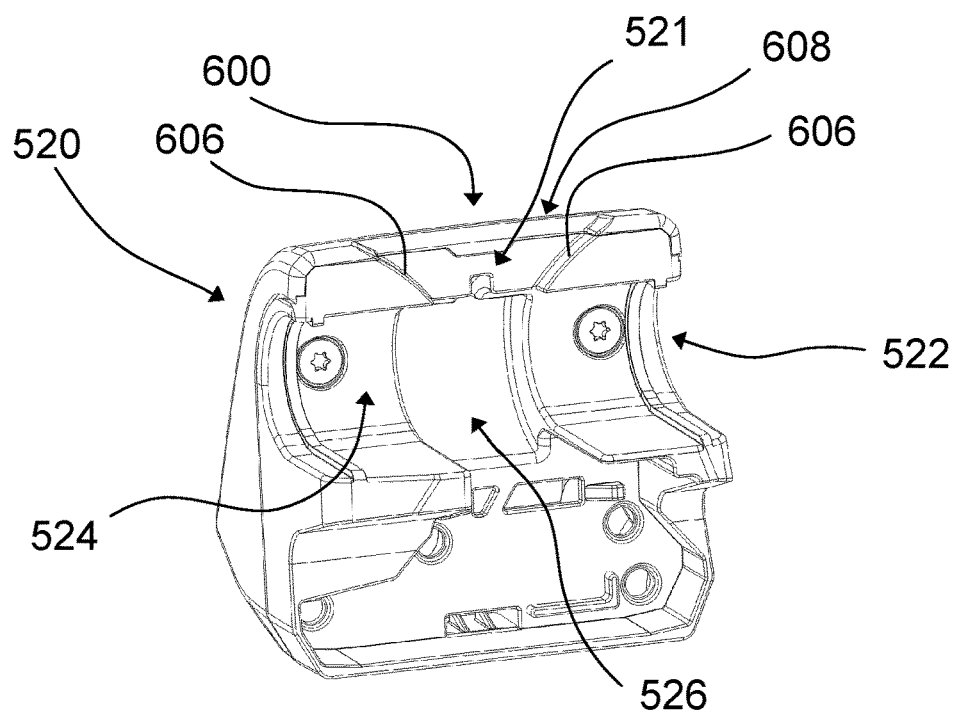
FIG. 14 shows a perspective view of the stationary locking member according to FIG. 12.

An optional configuration of the stationary locking member 520 will be described with reference to FIG. 12. FIG. 12 shows the stationary clamping member 520 in side view. As is visible from FIG. 12, the receiving section 522 comprises a clamping section 524. As can be gathered from FIG. 12, the receiving section 522 has a U-shape which in the present configuration is substantially semi-circular. The stationary locking member 520 can be preferably configured for providing two supporting points, contact points or sections of a three-point locking or clamping as described in the introductory portion. An upper end portion 528 of the receiving section 522 is configured with an inclined surface 527 which is inclined downwards towards a lower end portion 529 of the receiving section 522 in a direction towards the movable locking member 510. The upper end portion 528 may thus comprise a surface area which is inclined with respect to the horizontal direction so that the inclined surface portion spans an angle α with respect to the horizontal direction as is shown in FIG. 12. In this way, the upper end portion is configured to prevent an inserted mounting portion 300, 400 from coming of the stationary receiving member 520 when a force exerted in vertical upward direction is applied on the mounting portion 300, 400. Another surface portion on the stationary locking member which may be located on the receiving portion of the stationary member at a substantially opposite position to the latter inclined surface portion may be referred to as lower inner surface portion 530 and may be inclined in the same direction as the top inner surface portion, i.e. the inclined surface 527, but with a greater angle β, preferably an angle of substantially 25 degrees which even further prevents that the mounting portion is forced to move backwards when the bike is swaying from side to side during transport. A third point may be provided on the movable locking member, for example on a substantially vertically extending wall portion of the movable locking member. As shown in FIG. 14, the stationary locking member 520 can comprise a recess 521 for receiving an upper portion of a guiding portion 304, 404 of a mounting portion 300, 400 when said mounting portion 300, 400 is received in the movable locking member 510 and moved towards the stationary locking member 520.

As already mentioned above, the locking mechanism 500 can be configured to at least partially automatically transfer into a locking state when the mounting portion 300, 400 is at least partially inserted into the supporting unit 100. Such a function may be implemented by a blocking unit 550 for blocking a movement of the movable locking member 510 in at least an opening direction of the movable locking member 510. The blocking unit 550 can comprise an engaging unit which is configured to engage behind or with the at least one movable locking member in order to temporarily block a movement of the movable locking member 510 in the opening direction. In the embodiment as shown in FIGS. 4 to 9, the engaging unit 560 is configured to engage behind the movable locking member 510 and thus, when being engaged behind the movable locking member 510, serves as an abutment which prevents a movement of the movable locking member 510 in the opening direction. The engaging unit 560 according to the embodiment comprises a blocking member 570 which is able to automatically engage behind the movable locking member 510 when the movable locking member has been moved by a predetermined distance towards a positive locking position.

As is shown in FIG. 13, the movable locking member 510 comprises a first contact portion 517 which in the embodiment is provided in the form of an upper surface, an edge portion 518 forming an edge of the upper surface and a second contact portion 519 which is defined by a rear end surface of the movable locking member 510 in the embodiment. The blocking member 570 is configured to cooperate with the first contact portion 517 and the second contact portion 519 of the movable locking member 510. The blocking member 570 comprises a segment-like shape when viewed from the side as is shown in FIG. 10. The blocking member 570 is configured to be pivotably movable about a pivot axis A1. For that, the blocking member 570 comprises an opening 578 through which a pivot pin 579 can be inserted for mounting the blocking member 570 in the locking mechanism 500. The blocking member 570 further comprises surfaces which get in contact with the first contact portion and the second contact portion of the movable locking member 510. In the embodiment, the blocking member 570 comprises a cam surface 572 which is configured to get in contact with the second contact portion 519. The cam surface 572 is a curved surface which extends about the pivot axis A1. Furthermore, the blocking member 570 comprises a sliding surface 576 which is configured to get in contact with the first contact portion 517. As long as the sliding surface 576 is in contact with the first contact portion 517, a rotation of the blocking member 570 into the locking position is prevented as the first contact portion 517 serves as an abutment surface preventing a rotation of the blocking member 570.

The cam surface 572 can be configured such that a force exerted on the force receiving portion is directed such that the movable locking member 510 is urged towards a positive locking position. Stated differently, the cam surface 572 which may also be referred to as locking surface may function in the manner of a wedge and can be configured in a wedge like manner. Accordingly, play in the system between the mounting portion and the locking members which for example may result from vibrations can be prevented. In this way, it is ensured that the mounting portion can only become tighter tensioned and cannot loosen. In a possible configuration of the cam surface 572, the distance of the cam surface from a rotational centre of the blocking member, i.e. from pivot axis A1, can be smaller on a section 572a of the cam surface contacting the movable locking member first than on a surface section 572b which contacts the movable locking member when the blocking member 570 is further rotated in engaging direction. Thus, the distance from the rotational centre to the cam surface section that makes contact with the movable locking member may increase with a rotation of the blocking member in engaging direction. According to a preferable configuration, the latter described distance can vary in a range from 2 mm to 5 mm, preferably from 2 mm to 4 mm. Preferably, the latter described distance is substantially 3 mm or exactly 3 mm.

Figure 9:
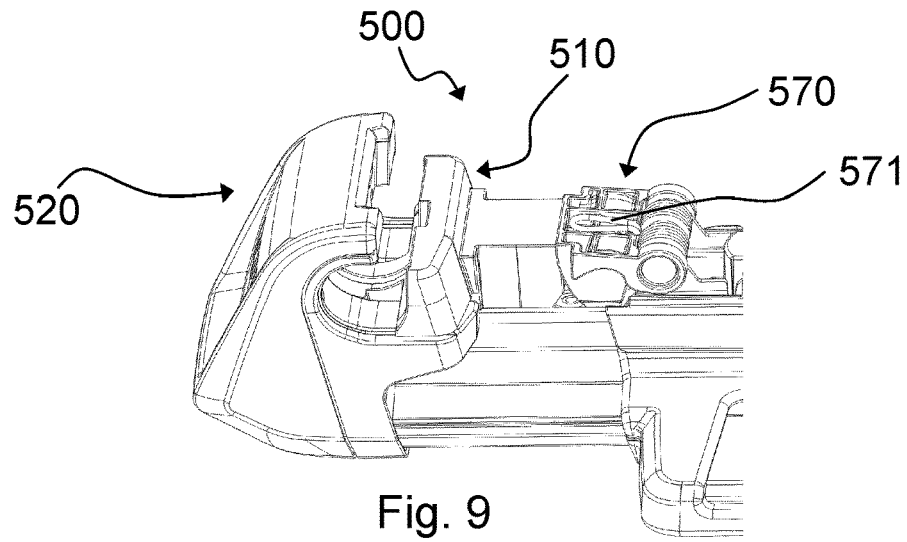
FIG. 9 shows a perspective view on the supporting unit and in particular shows details of the locking mechanism according to an embodiment.

The blocking member 570 can be biased towards the locking position by means of a biasing member 571. The biasing member 571 can be a spring or any suitable urging member that allows to pre-bias the blocking member 570 in the desired direction. The spring may be a coil spring. If the blocking member 570 is biased towards the locking position, the blocking member 570 is able to automatically engage behind or with the movable locking member 510 when the at least one movable locking member 510 has been moved by a predetermined distance towards a positive locking position. Accordingly, the blocking member may be configured such that it rides on a portion of the movable locking member 510 and snaps behind the movable locking member 510 or alternatively into a recess or opening (not shown) when the same is moved up to a certain position. FIG. 9 shows an embodiment in which the blocking member 570 is pre-biased by a biasing member 571 in the form of a spring.

The process of mounting a mounting portion 300, 400 on the supporting unit can be gathered from FIGS. 4 to 6. Optionally, the user may first mount the mounting portion 300, 400, in particular as mounting aid, on the fork of a bike prior to lifting the bike on the bike carrier. Then, the mounting portion is positioned vertically above the receiving section of the supporting unit 100 as shown in FIG. 4. After that, the mounting portion 300, 400 is lowered into the receiving section of the supporting unit as is shown in FIG. 5. After that, the mounting portion 300, 400 is moved towards the stationary locking member 520 towards a locking position, i.e. towards the left in FIGS. 4 to 6. In FIG. 6, the movable locking member 510 has reached the locking position and the blocking member 570 already moved downwards to engage behind the movable blocking member 510 and to provide an abutment portion so that the movable locking member 510 cannot move in opening direction, i.e. towards the right in FIGS. 4 to 6. In this state, the cam surface 572 is in contact with and pressed on the rear surface of the movable locking member 510.

Dismounting may be achieved by the steps operating the release lever 590 by pushing down the release lever 590, in order to return the blocking member into an unlocking state or unlocking position as is shown in FIGS. 7 and 8. This enables the movable mounting portion to be moved towards the open position. For that, the locking mechanism 500 comprises a force application member 594 which can be brought in contact with a force receiving surface 574 provided on the blocking member 570. The force application member 594 is operatively coupled to the release lever 590 in such a manner that it presses against the force receiving surface 574 for bringing the blocking member into the open position or unlocking position. In the embodiment as shown in FIGS. 7 and 8, the force application member 594 is a protrusion 594 protruding from a side wall 592 of a housing coupled to the release lever 590.

According to a configuration, a user may pull the movable mounting portion, for example the movable locking member 510, back while holding the release lever 590 down. The movable locking member 510 may according to a preferable configuration slide beneath the blocking member 570, in particular under the above-mentioned sliding surface 576. As soon as the movable locking member 510 is partially beneath the blocking member, for example beneath the sliding surface 576, the user may let go of the release lever and the blocking member may go down on top of the movable locking member 510. According to this preferable configuration, the bike may now be removed from the supporting unit and the supporting unit is in a condition ready for locking a mounting portion thereon.

As already mentioned before, the locking mechanism 500 according to the embodiment may comprise an indicator 580 which is movable between a retracted position and a deployed position. The indicator 580 as shown is configured as a tilt lever pivotably movable about a pivot pin 582. The indicator may comprise a operating portion 586 and an indicating portion 588 arranged on opposite sides of the pivot pin 582. Furthermore, the indicator 580 may be pre-biased by means of an urging member (not shown), preferably a spring, towards the deployed position, which means in counter-clockwise direction in FIGS. 4 to 6. The operating portion 586 is configured to get in contact with the blocking member 570 or may optionally be configured to be operatively coupled to the blocking member 570 in such a manner that a movement of the indicator 580 between the retracted and the deployed position takes place dependent on a movement of the blocking member 570. In the shown configuration, the operating portion 586 is in contact with an upper portion of the blocking member 570, more precisely pushed on the upper portion of the blocking member 570, when the blocking member 570 is in the unlocking position as shown in FIG. 4. In case the blocking member 570 is in the locking position as for example shown in FIG. 6, the operating portion 586 is no longer in contact with and supported by the blocking member 570 leading to a movement of the indicator into the deployed position indicating that the locking mechanism is securely locked. In the deployed position, the operating portion 586 rests on a stop portion provided in the housing. As is shown in FIGS. 1 to 6, the blocking member 570 may be arranged on a housing of the locking mechanism, in particular on a housing coupled to the lever 590, such that the indicating portion 588 is arranged in an opening in the housing substantially flush with an upper wall of the housing and may protrude from the housing in the deployed position. The indicating portion 588 may comprise an indicating surface 589, for example colored in green and being provided on lateral sides of the indicator portion 588 as shown in FIG. 6. Thus, the indicating surface 589 is visible when the indicator 580 is in the deployed position signaling the user a correct locking of the mechanism. When the lever 590 coupled to the housing is moved for pivoting the blocking member 570 into an unlocking position and the blocking member 570 is held in position by the movable locking member 510 which is positioned in the open position, the operating portion 586 may get in contact with the upper portion of the blocking member 570 again which will bring the indicator 580 in the retracted position when the lever 590 is released.

Figure 40:
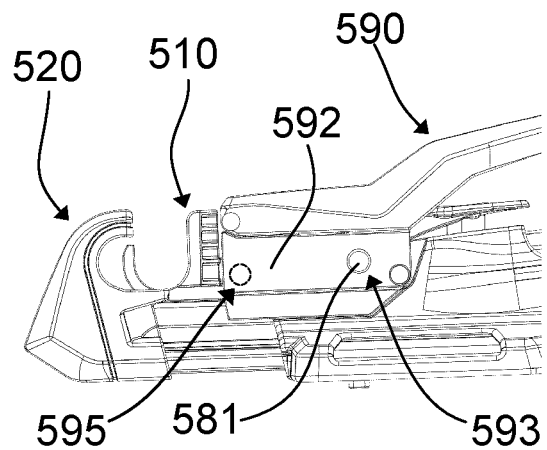
FIGS. 41 and 40 show a modification of an indicator of the locking mechanism.
Figure 41:
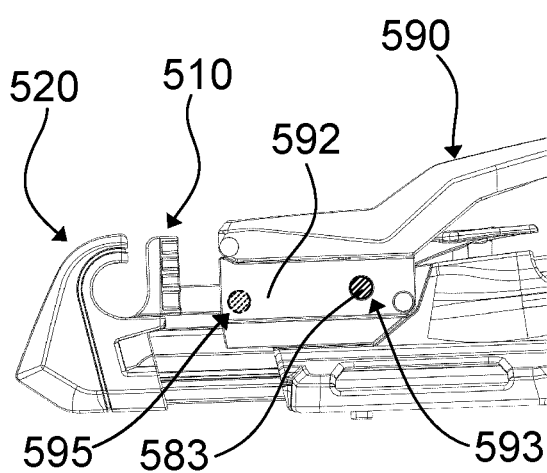

The indicator may be provided in a different manner as will be described with reference to FIGS. 40 and 41. For example, an opening 593 functioning as a window may be provided in a side wall 592 of a housing of the locking mechanism 500. The movable locking member 510 may be provided with or coupled to an interior movable indicator element (not shown) which is movable relative to the opening 593 such that different portions of the same are visible from outside the housing. The movable indicator element may comprise a first surface portion, preferably a colored surface portion, which is aligned with the opening 593 when the movable clamping member 510 is unlocked. In addition or alternatively the movable indicator portion comprise at least a second surface portion 583, preferably a colored surface portion, which is aligned with the opening 593 when the movable clamping member 510 is locked thereby signalizing to a user that locking is securely provided. An alternative modification of the indicator is also shown in FIGS. 40 and 41. In this modification, an opening 595 or window is provided in the side wall 592 at a position at which a portion of the rotatable blocking member 570 is aligned with the opening 595 when the blocking member 570 is in a locking position. Thus, the blocking member 570 can have a double function, namely blocking the movable locking member 510 and indicating a correct locking. The latter portion of blocking member 570 may be colored or the entire blocking member may be colored in order to make a specific state of the locking mechanism immediately recognizable by a user.

In FIGS. 13 to 17, a further optional configuration of the supporting unit 100 is shown. The configuration provides a guiding function in the supporting unit 100 for guiding the mounting portion 300, 400 into a desired fixation position and for assisting a user in inserting the mounting portion 300, 400 into the supporting unit 100. For that, the supporting unit 100 comprises a guiding arrangement 600. This guiding arrangement 600 is configured to guide the mounting member 300, 400 such that it can be easily and correctly mounted in the supporting unit 100. This can be of great help in particular if the mounting portion 300, 400 is provided on the fork of a bike so that the mounting portion has to be inserted into the supporting unit 100 by handling the bike. By using the guiding arrangement 600, it is possible to compensate deviations from an optimum orientation of the mounting portion 300, 400 for inserting the same in the supporting unit 100. For example, if the mounting portion 300, 400 is an elongate member or axle, for example an axle adapter to be fixed on the fork of the bike, the optimum orientation for inserting the same can be an orientation in which the elongate member is oriented substantially horizontal and perpendicular to the longitudinal direction of the bike carrier.

The guiding arrangement 600 according to the embodiment may be preferably adapted to receive the mounting portion 300, 400 in a first direction P1 cross to the longitudinal direction L of the supporting unit 100. In this connection, cross to the longitudinal direction may include all directions that do not coincide with or are parallel to the longitudinal direction of the bike carrier 1. This may in particular include directions for inserting the mounting portion 300, 400 on the bike carrier from above. Accordingly, the mounting portion 300, 400 may be received by the guiding arrangement 600 even if the first direction P1 is not perpendicular to the longitudinal direction L.

In a preferable configuration, the guiding arrangement 600 is configured such that the bike with the mounting portion 300, 400 on the fork can be lifted on the bike carrier from a lateral side of the bike carrier such that the bike is first supported on the bike carrier 1 in an inclined manner in which the bike is held with a hand while the rear wheel and the mounting portion 300, 400 are supported on the bike carrier 1, and can then be positioned upright by rotating the bike into the upright position. For that, the guiding arrangement 600 can comprise a guiding surface 606 which is curved such that a guiding portion 304, 404, for example a guiding portion 304, 404 as described herein, preferably a protrusion 306, 406, of the mounting portion 300, 400 may be supported on the guiding surface 606 and may slide on the guiding surface 606 during rotating the bike into the upright position. In the embodiment shown, two guiding surfaces 606 are provided symmetrically with respect to a middle plane thereby forming a guiding recess 604 between them. The guiding surfaces 606 can be curved concavely towards each other thereby forming a wider insertion section 608 which narrows towards a fixation section 610. The fixation section 610 of the guiding arrangement 600 can be provided in the base portion 511 of the movable locking member. The insertion section 608 can be provided in the side wall 513 of the movable locking member 510. A further insertion section 608 can be provided in an upper portion of the stationary locking member 520 and can be configured to guide the mounting portion 300, 400 into the receiving section 512 of the movable locking member 510. The guiding arrangement 600 can thus be provided in a manner in which it is partially provided on the stationary locking member 520 and continues on the engaging portion 516 of the movable locking member 510 when the movable locking member 510 is in an open position as shown in FIG. 4, for instance. The guiding arrangement 600 with its section being partially provided on the stationary locking member 520 and the movable locking member 510 can also be gathered from FIGS. 15 to 17.

Figure 15:
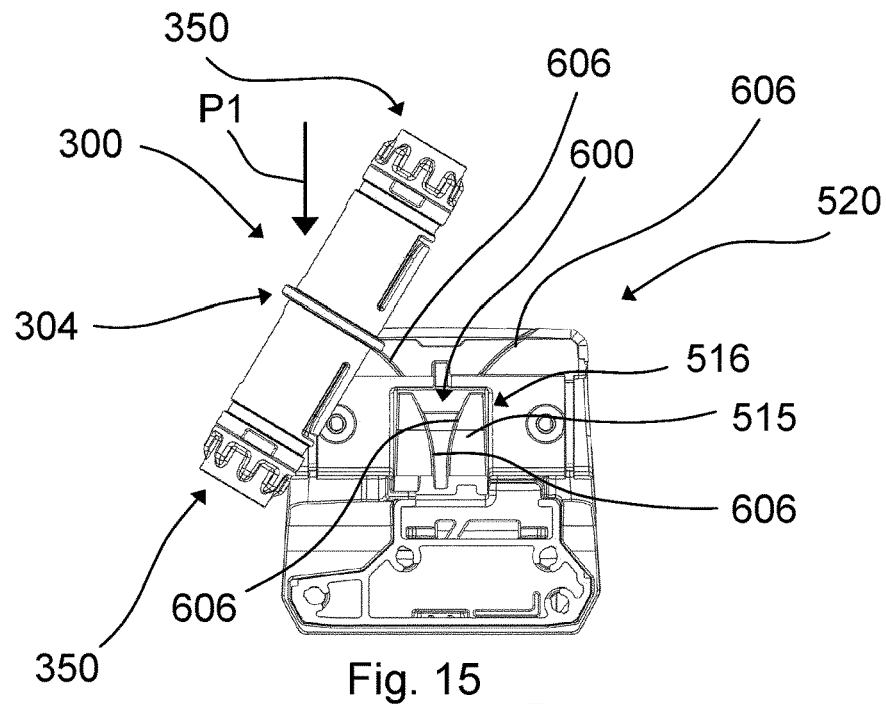
FIGS. 15 to 17 show a mounting process of a mounting portion in a supporting unit according to a further embodiment.
Figure 16:
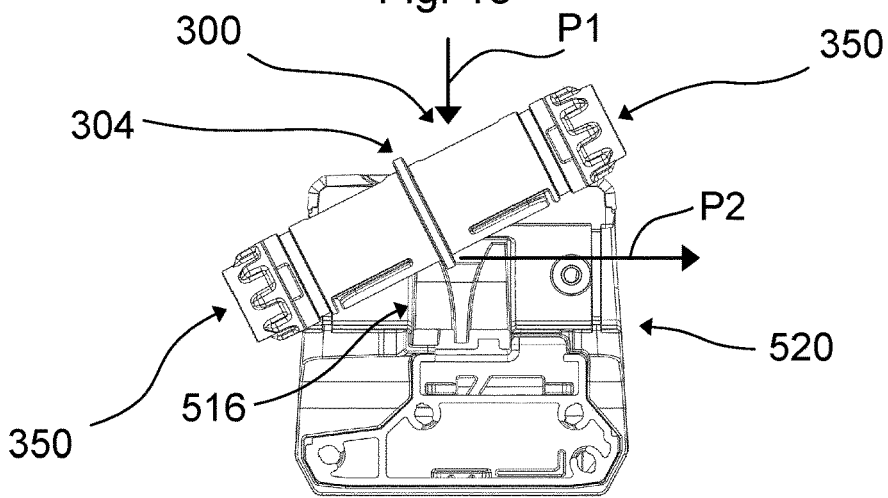
Figure 17:
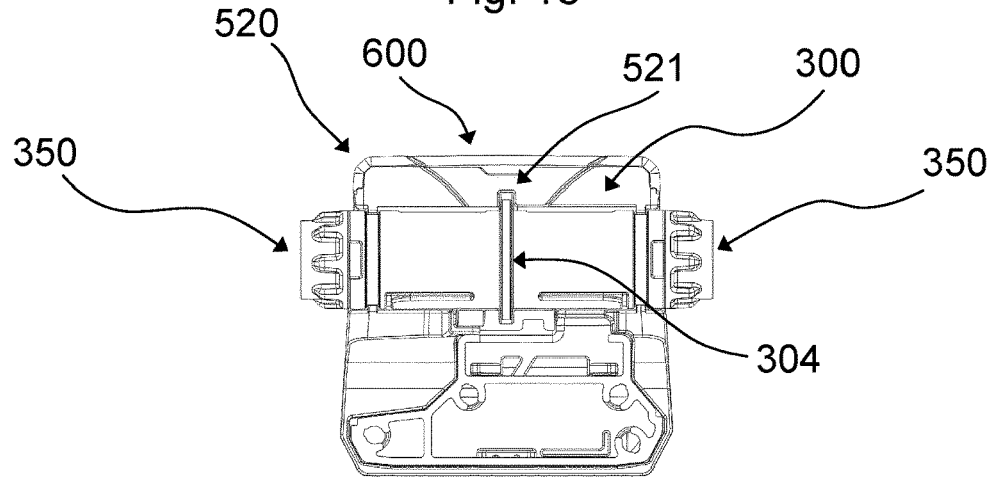

In FIGS. 15 to 17, an insertion process of the mounting portion 300, 400 as described before is shown wherein FIGS. 15 to 17 show a sectional view which is taken perpendicular to the longitudinal direction of the bike carrier through the base portion 511 of the movable locking member 510 and viewed in forward direction, i.e. in a direction of the stationary locking member 520. In this sectional view, it is well visible that the guiding surfaces 606 starting in the insertion section 608 on the stationary locking member 520 are continued on the movable locking member 510 in its engaging portion 516. In FIG. 15, a guiding portion 304 of the mounting member 300 is supported on an upper portion of the guiding surface 606. This state reflects a state in which the bike on which the mounting portion 300 is mounted, is held in the above-mentioned inclined state. In FIG. 16, the mounting member 300 was already rotated in clockwise direction and therefore already sled along the guiding surface 606 up to a position in the movable locking member 510. In other words, the guiding portion 304 entered the portion of the guiding arrangement 600 provided on the engaging portion 516 of the movable locking member 510. From this position, the guiding portion 304 is guided further downwards into a state as shown in FIG. 17 where the mounting portion 300 rests on the base portion 511 with the guiding portion, preferably a protrusion, being accommodated in a lower portion of the guiding recess 604 of the guiding arrangement. In this state, the mounting portion 300 is correctly positioned in the receiving section 512 of the movable locking member 510. Due to the shape of the guiding surface 606, the mounting portion 300 is moved in direction P2 and thus brought into the correct position.

In general, the guiding arrangement 600 is adapted to receive the mounting portion 300; 400 in the first direction P1 and to guide the mounting portion 300; 400 in a second direction P2 different to said first direction P1 during insertion of the mounting portion 300; 400 such that the mounting portion 300; 400 is shifted to a desired fixation position on the supporting unit 100 at least in a direction cross to the longitudinal direction L of the supporting unit 100. A mounting portion arranged in the supporting unit 100 in such a manner is ready to be moved towards the stationary locking member 520 in order to lock the same on the supporting unit 100 in a manner as described before.

A further configuration of a locking mechanism 500 will now be described with reference to FIGS. 18 to 20. The configuration according to this modification differs from the locking mechanism as described before in that the movable locking member 510 is not translatory movably mounted but held rotatable about a pivot axis A2. The movable locking member 510 comprises a U-shaped member 540. Thus, when an inserted mounting portion 300, 400 is moved from an opened position as shown in FIG. 19 into the positive locking position as shown in FIG. 20, the movable locking member 510 is pivoted, in counterclockwise direction in the embodiment. In this way, a rear portion of the movable locking member 510 is moved behind the mounting portion 300, 400 and the blocking member 570 is able to move behind the movable locking member 510 thereby providing an abutment preventing a rotation of the movable locking member 510 in an opening direction, i.e. in clockwise direction according to the embodiment, as is shown in FIG. 20.

Figure 18:
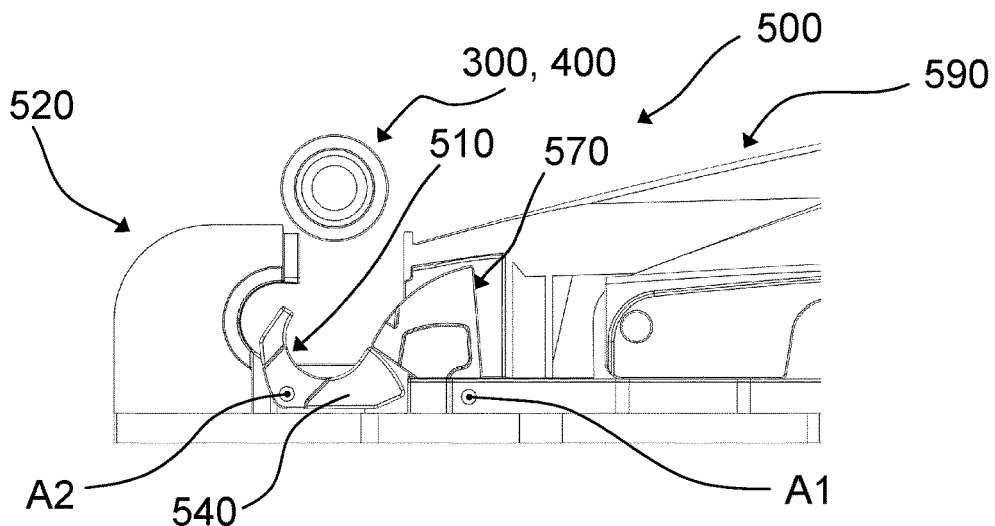
FIGS. 18 to 20 show a side view of a supporting unit according to a further embodiment.
Figure 19:
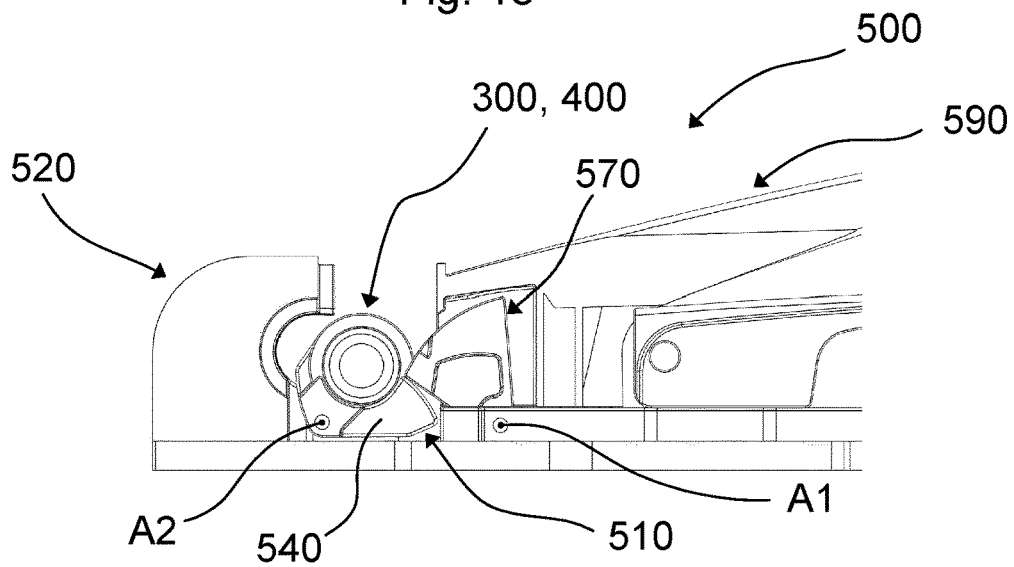
Figure 20:
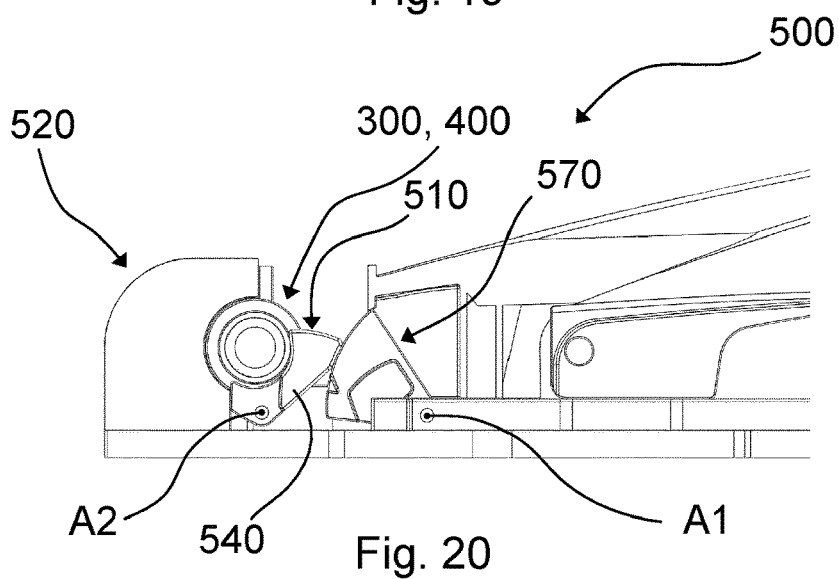
Figure 38:
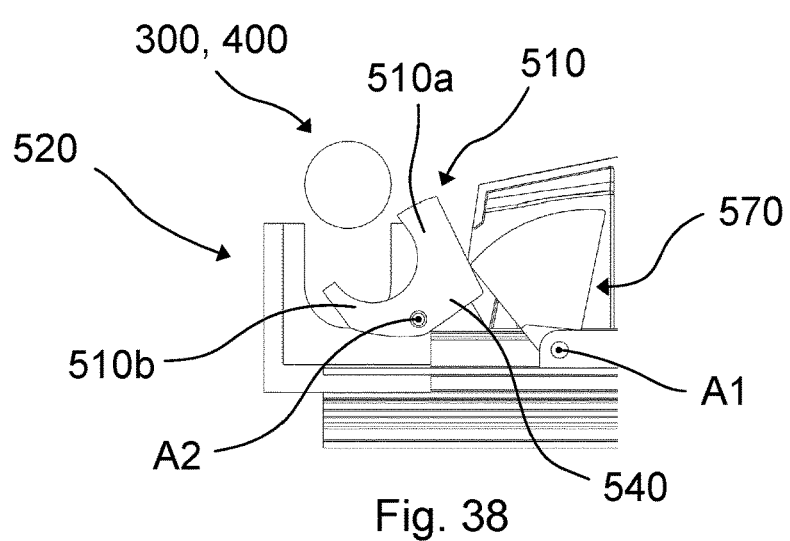
FIGS. 38 and 39 show a modification of the locking mechanism of FIGS. 18 to 20.
Figure 39:
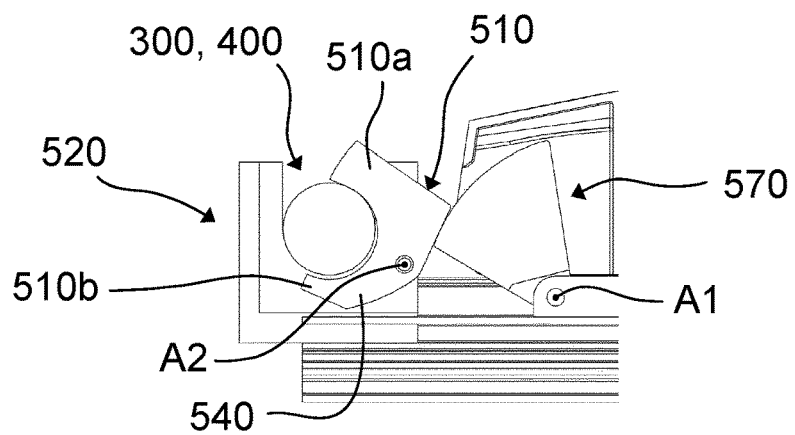

A modification of the locking mechanism of FIGS. 18 to 20 is shown in FIGS. 38 and 39. The locking mechanism 500 according to the modification is configured to receive and lock the mounting portion 300, 400 with a movement in only one direction. In this way, there is no need for a user to move the bike in a direction which differs from the insertion direction as mentioned before. In contrast to the locking mechanism of FIGS. 18 to 20, a movement in the longitudinal forward direction is not necessary and the mounting portion 300, 400 may be brought into a locking position by a downward movement in only one direction. According to the embodiment shown, the movement direction of the mounting portion 300, 400 can be a substantially vertical downward direction.

The modified locking mechanism 500 again comprises a movable locking member 510 which is not translatory movably mounted but held rotatable about a pivot axis A2. In contrast to the configuration of FIGS. 18 to 20, the stationary locking member 520 is configured to receive the mounting portion 300, 400 in vertical direction from above. For that, the stationary locking member 520 can be configured as a U-shaped member with its opening oriented in vertical upward direction. The movable locking member 510 again comprises a U-shaped member 540 with an opening between two end portions 510a, 510b. The locking mechanism 500 according to the modification is configured so that the pivot axis A2 is arranged offset from an insertion path, preferably straight insertion path as defined by the stationary locking member 520, of the mounting portion 300, 400. The U-shaped member is movable between an open position as shown in FIG. 38 and a closed position as shown in FIG. 39. In the open position, the U-shaped member is arranged inclined with respect to the U-shaped portion in the stationary locking member 510. In this way, the mounting portion 300, 400 may be received in the movable locking member 540 and may exert a force on lower end portion 510a leading to a rotation of the movable locking member 510 in such a manner that the upper end portion 510b is brought behind the mounting portion 300, 400. The rotation of the movable locking member 510 into the locking position also enables the blocking member 570 to move behind the movable locking member, in particular that the blocking member 570 moves into a locking position in which the blocking member serves as an abutment preventing a rotation of the movable locking member 510 towards the open position as shown in FIG. 38.

Also disclosed are a number mounting aids, all of them being usable in connection with the above supporting unit 100 but some of them also being usable in connection with a modified supporting unit 700 which is configured to fixedly hold the mounting aid therein prior to mounting a bike to the supporting unit. The mounting aids will be described with reference to FIGS. 21 to 33 and the modified supporting unit will be described with reference to FIGS. 34 to 36.

In general, the types of mounting aids or mounting portions described herein can be seen as adapters to be fixed on the fork of a bike instead of a wheel of a bike. Some of the mounting aids are also configured to be mounted on the supporting unit prior to fixing the fork of a bike thereto.

Figure 21:
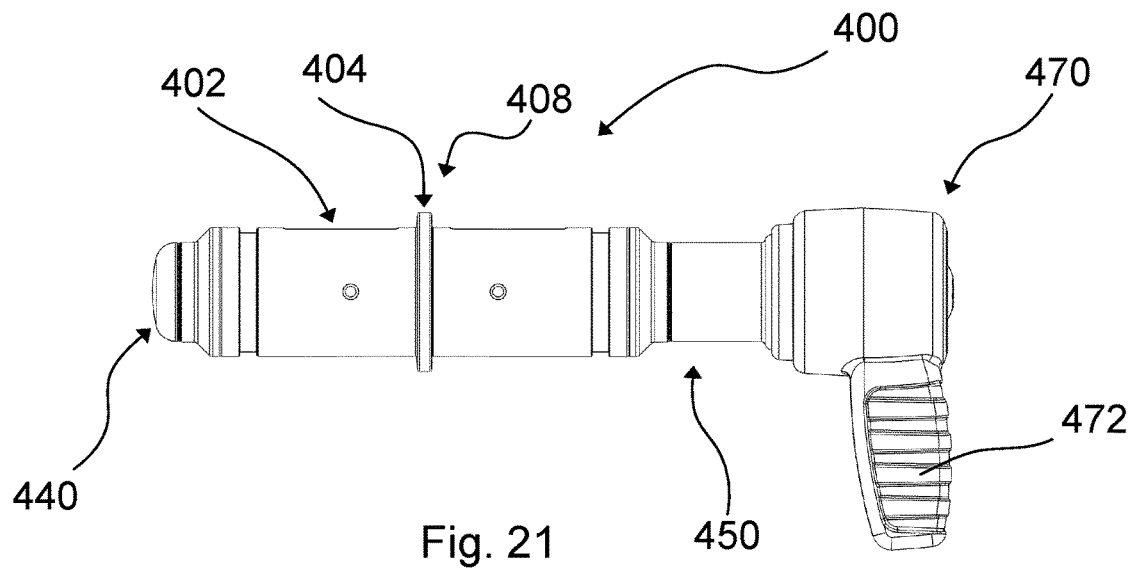
FIGS. 21 and 22 show side views of a mounting aid according to an embodiment in an opened and closed condition, respectively.
Figure 22:
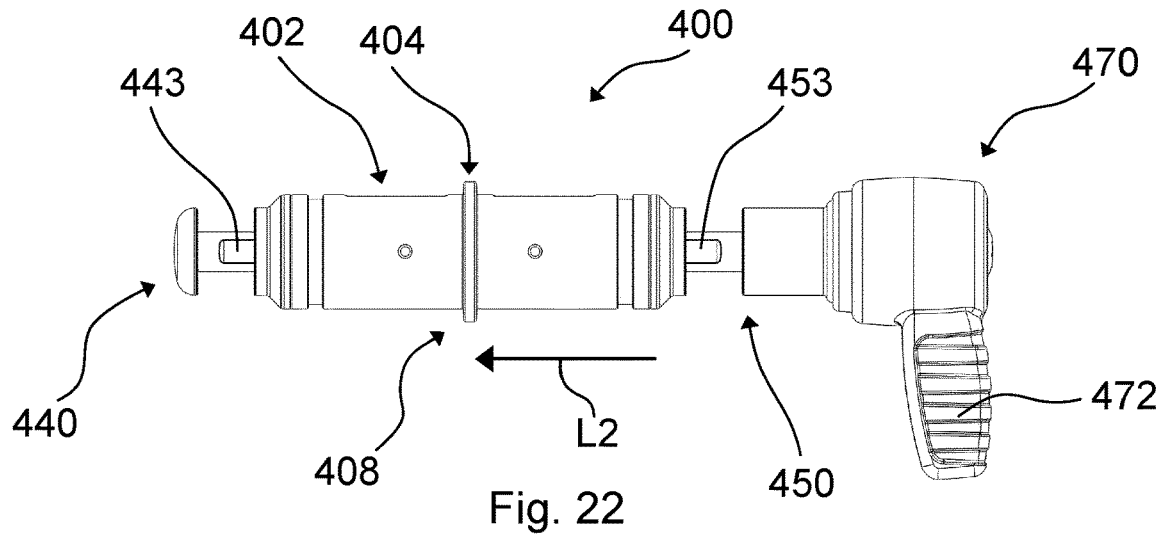
Figure 23:
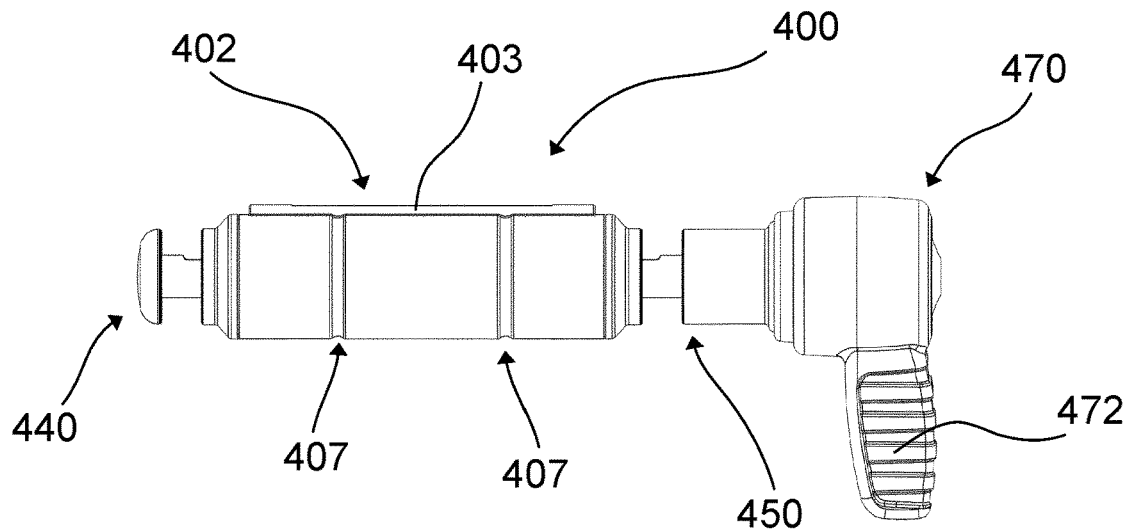
FIG. 23 shows a further configuration of a mounting aid according to an embodiment.
Figure 24:
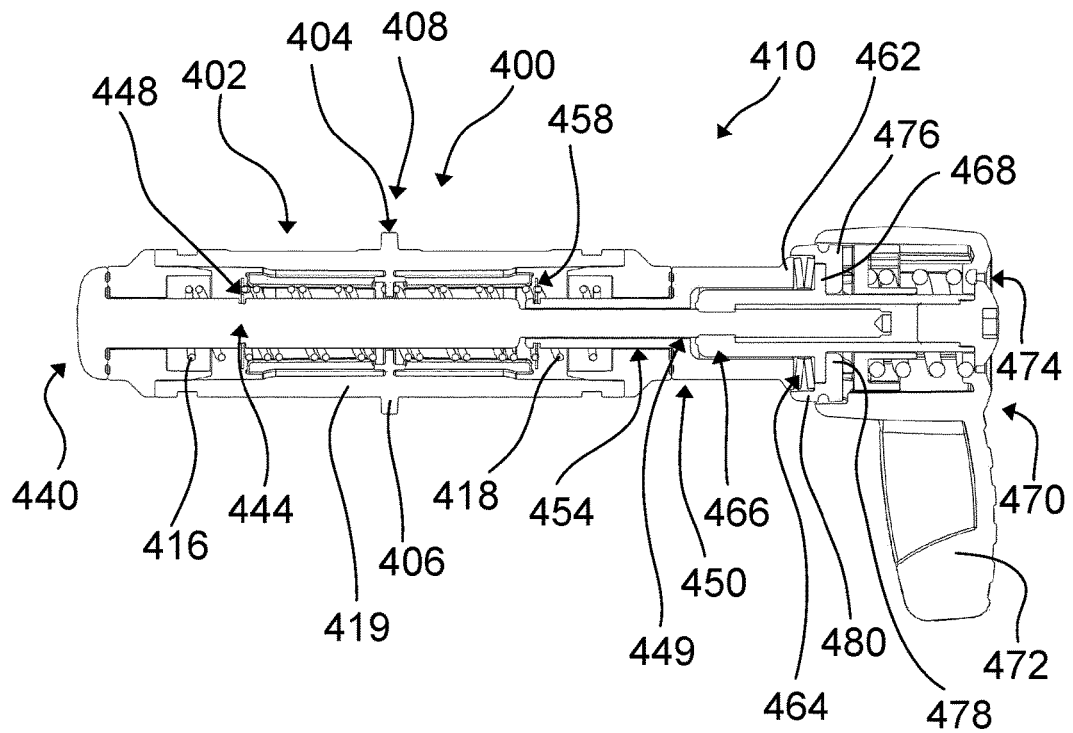
FIGS. 24 and 25 show sectional views of the mounting aid of FIGS. 21 and 22, respectively.
Figure 25:
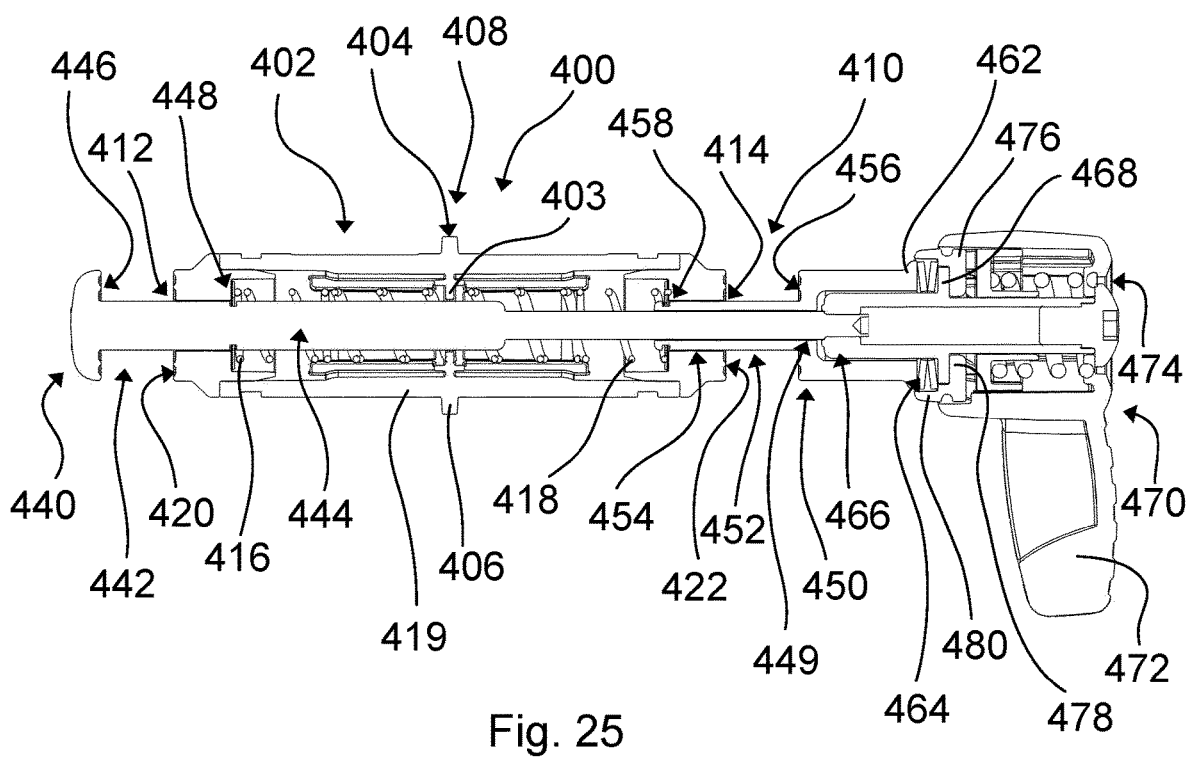

A specific type of mounting aid 400 for mounting the fork of a bike to a bike carrier is disclosed and described with reference to FIGS. 21 to 25. The mounting aid 400, which may form a mounting portion, is configured to function as an interface between the fork and a bike carrier for fixedly mounting the fork to a bike carrier, for example to a bike carrier as described above, in particular for mounting the fork to a supporting unit 100 as described above. The mounting aid 400 can be configured to be mounted to the fork prior to inserting the same on the bike carrier or can be fixedly mounted on a bike carrier for mounting the fork to the bike carrier. A configuration of the mounting aid 400 is shown in FIGS. 21, 22, 24 and 25. A slightly modified configuration of the mounting aid 400 is shown in FIG. 23.

Figure 34:
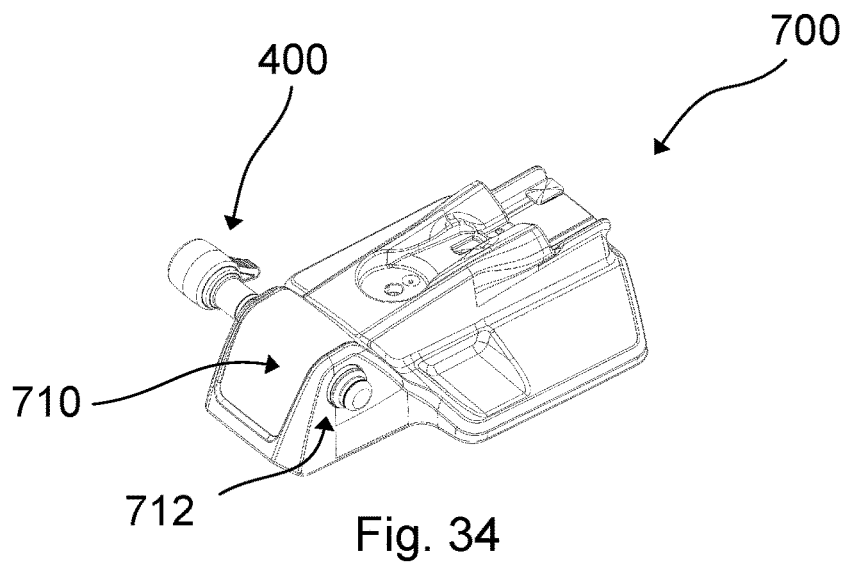
FIG. 34 shows a perspective view of a supporting unit according to a further embodiment.
Figure 35:
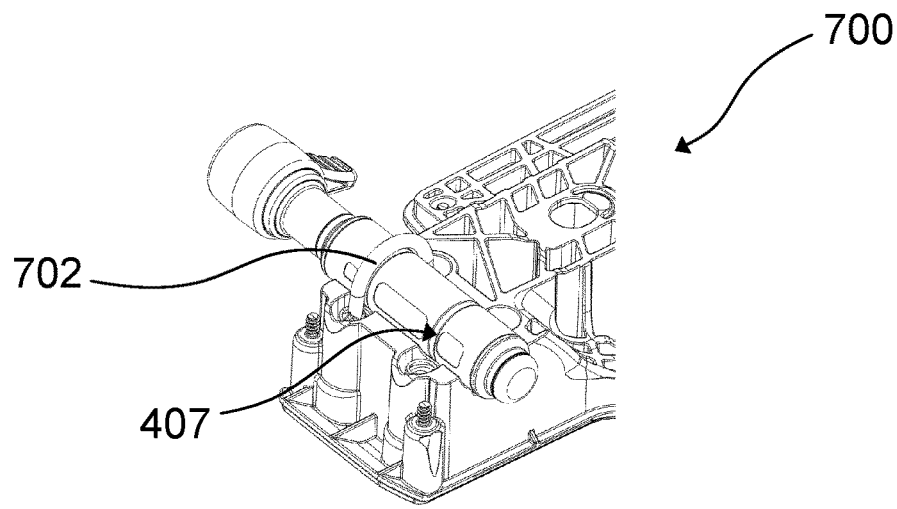
FIG. 35 shows an interior structure of the supporting unit of FIG. 34.
Figure 36:
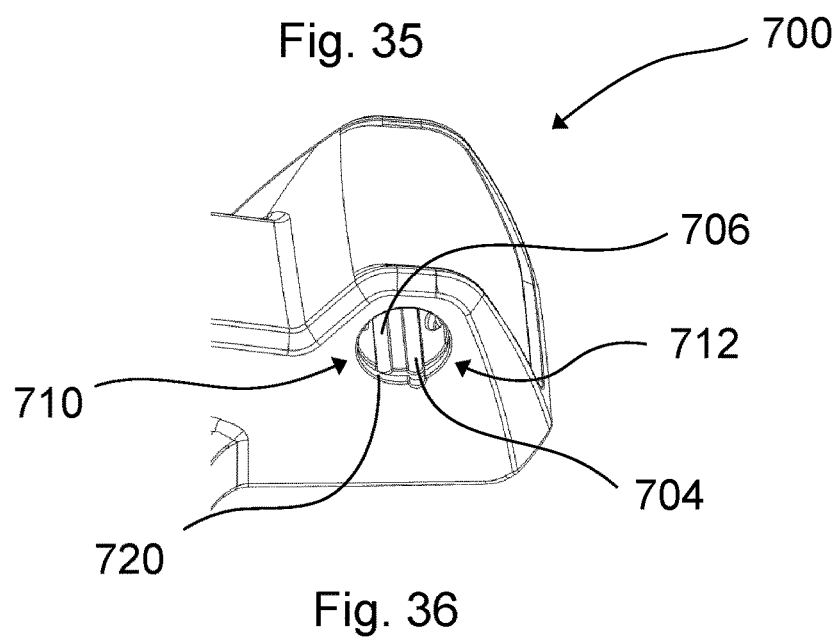
FIG. 36 shows a further perspective view of the supporting unit of FIG. 34.

In general, the mounting aid 400 comprises an elongated main portion 402 and a quick release skewer type clamping mechanism 410 configured to simultaneously clamp each end portion of the fork between a movable clamping member 440, 450 and the main portion 402. The main portion 402 can comprise a cylindrical shape. On its outer circumference, the main portion 402 can comprise a guiding portion 404 which may be embodied as a protrusion as shown in FIGS. 21 and 22. However, such a guiding portion 404 is only necessary if the mounting aid 400 is to be used in connection with a guiding arrangement, for example with a guiding arrangement 600 as described above. According to an embodiment, the guiding portion 404 can be omitted. According to a modification as shown in FIG. 23, the main portion 402 can also be configured such that it is fixedly mountable on a bike carrier, for example on a bike carrier as shown in FIGS. 34 to 36. For that, the main portion can comprise a mounting recess 407 configured to cooperate with a mounting bracket 702 of a supporting unit 700 of a bike carrier. Furthermore, according to the modification, the main portion 402 can comprise a protrusion 403 extending in longitudinal direction of the main portion 402 which is configured to be inserted into a groove 704, 706 provided in a supporting unit 700 of a bike carrier as shown in FIGS. 34 to 36. Such grooves 704, 706 extend in lateral direction of the supporting unit 700 in a mounting portion 710. The mounting portion 710 is a sleeve-like arrangement having two lateral openings 712 on opposite sides and a cylindrical inner wall ranging from one opening to the other and having the grooves 704, 706 formed therein. Each groove is arranged such that it is accessible from only one opening and is configured to help centering the mounting aid 400 in the supporting unit 700. Since the grooves do not extend fully through the mounting portion 710, a wall portion 720 is available serving as a stop on a side opposite to the insertion side of the mounting aid 400 and defining an optimum position for the mounting aid 400 in cooperation with the protrusion 403.

The movable clamping members 440, 450 can be configured for a direct contact with the fork. The movable clamping members 440, 450 are arranged so as to be movable with respect to the main portion 402 in a non-rotatable but axially movable manner. Each movable clamping member can comprise an elongated support portion 442, 452. In the embodiment, the elongated support portions 442, 452 are a shaft 444 and a hollow shaft 454, respectively. Each elongated support portion 442, 452 is slidably accommodated in a support opening 412, 414 of the main portion 402. The elongated support portion and the support opening comprise at least partially non-round cross sectional outer and inner contours, respectively. Accordingly, the movable clamping members are locked in rotation with respect to the main portion thanks to a non-uniform cross section. Locking the rotation of the movable clamping members 440, 450 means that all elements clamping on the bike fork legs are moving linearly and are not transmitting any rotational force to the fork legs. This in turn means less risk of damaging the bike and more controlled friction in the system ensuring a more stable clamping force. In the embodiment, the support portions 442, 452 comprises a flat surface section 443, 453 and the support opening 412, 414 comprises a correspondingly shaped flat inner surface section that are arranged in sliding contact with each other thereby preventing a rotation of the movable clamping member 440, 450.

Each movable clamping member comprises a force application portion 446, 456 and the main portion can comprise clamping portions 420, 422 each configured for supporting an end portion of the fork of the bike when a force is applied on the end portion by the force application portion 446, 456.

A first movable clamping member 440 of the movable clamping members comprises a coupling section 449 for coupling the first movable clamping member to a force application member 466. The coupling section 449 comprises a threaded portion provided on the shaft 444. The force application member 466 is a force application member for applying a pulling force on the first movable clamping member 440. The first movable clamping member 440 is configured and arranged in the main portion 402 such that the coupling section 449 and the force application portion 446 are arranged on opposite sides of the main portion 402.

A second movable clamping member 450 of the movable clamping members can be partially and slidably held in the main portion 402 between a portion of the shaft 444 and the main portion 402 such that the second movable clamping member 450 is slidably held in the opening 414 and the shaft of the first movable clamping member 440 is slidably held in a hollow shaft portion 454 of the second movable clamping member 450.

The mounting aid further comprises a balancing system. The balancing system is preferably provided, e.g. housed in the main portion 402. The balancing system comprises urging members 416, 418 embodied as springs. The urging members 416, 418 are coupled to the movable clamping members such that the movable clamping members 440, 450 are pre-biased towards an open position. The main portion 402 can comprise a centre inner wall extending perpendicular to the longitudinal direction of the main portion 402. The urging members 416, 418 are provided on opposite sides of the centre inner wall 403 with one end of the urging members 416, 418 supported on the centre inner wall and the other end being supported against the movable clamping members 440, 450, respectively, by circlips 448, 458. The main portion 402 comprises press fit endings comprising the support openings and securing the balancing system.

The mounting aid 400 further comprises an operating unit 470 configured to be operated by a user and configured to transfer an operating force on the movable clamping members 440, 450. The operating unit 470 is configured to transfer the operating force on one of the movable clamping members 450 by means of an urging member 464. The urging member 464 is a spring pack comprising Belleville washers such that a preferably strong bias is generated when the movable clamping members 440, 450 are in a closed position in order to absorb any movement of the movable members during use of the mounting aid so that a sufficient clamping force can be securely maintained during use of the mounting aid 400. The urging member is provided in line with the operating force in order to compensate for a reduction in clamping force that might occur with time as some materials and components may settle slightly.

The operating unit 470 comprises an operating member 472. The operating member 472 is embodied as an eccentric lever. The operating unit 470 is configured to apply a pushing force on the second movable clamping member 450 and to apply a pulling force on the first movable clamping member 440 when the mounting aid is tightened.

The force application member 466 is threadedly engaged with the threaded portion 449 of the first movable clamping member and force transmittingly coupled to the second movable clamping member 450 by means of the urging member 464 such that an operation of the operating unit 470 urges the first movable clamping member 440 and the second movable clamping member 450 in opposite directions.

In the embodiment, the force application member 466 is arranged coaxially with the movable clamping members 440, 450 and comprises a force application portion 468 embodied as a flange and configured to apply a force on the urging member 464. The flange protrudes in a radial direction of the force application member 466. The force application portion 468 is configured to receive a torque from the operating unit 470. The operating unit 470 comprises a torque limiting mechanism 474 and the force application portion 468 is configured to receive a torque from the torque limiting mechanism 474. The torque limiting mechanism 474 comprises a force application member 476 with a force application section 478 configured to apply the torque on the force application portion 468. In the embodiment, the force application section 478 comprises a housing section 480 in which the urging member 464 and a force receiving portion 462 of the second movable clamping member 450 are accommodated. The urging member 464 and the force application portion 468 are arranged between the force receiving portion 462 and the force application section 478 of the force application member 476. Accordingly, the second movable clamping member 450 is configured to extend over the force application member 466 and partially accommodates the same therein and the urging member 464 is arranged on an outer circumferential portion of the force application member 466 which allows the use of stronger urging members, for example stronger spring washers having a greater diameter compared to other arrangement.

Figure 37:
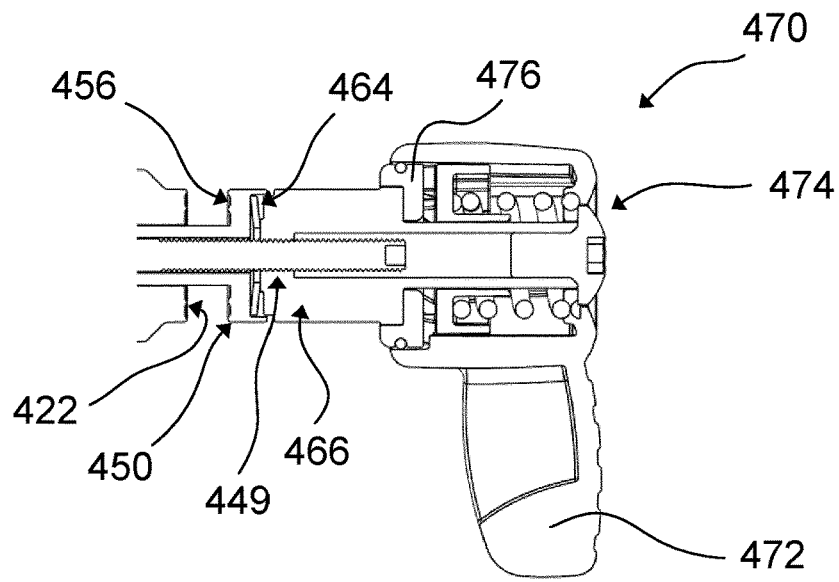
FIG. 37 shows a modification of the mounting aids shown in FIGS. 21 to 23.

A modification of the mounting aid 400 as shown in and described with reference to FIGS. 21 to 25 will be described with reference to FIG. 37. The modified mounting aid 400 of FIG. 37 differs from the arrangement shown in FIGS. 21 to 25 in that the urging member 464 is arranged at a different position. More precisely, according to the modification, the urging member 464 is arranged between a longitudinal end portion of the force application member 466 and does therefore not extend around an outer circumference of the force application member 466. Thus, an urging member 464 having a smaller size can be used. The urging member 464 according to the modification can be held in an end portion of the second movable clamping member 450 in a recess formed in a longitudinal end portion of the movable clamping member 450. Accordingly, an outer circumferential wall portion limiting the recess in radial direction is available for supporting the urging member 464 therein. The end portion of the force application member 466 can comprise a circumferential recess into which an end portion of the circumferential wall portion can be accommodated when the urging member is pressed.

A further type of mounting aid will now be described with reference to FIGS. 26 to 30. The mounting aids 300 shown therein are of the thru axle adapter type and are configured to be fixed to the fork of a bike using the forks thru axle.

Figure 26:
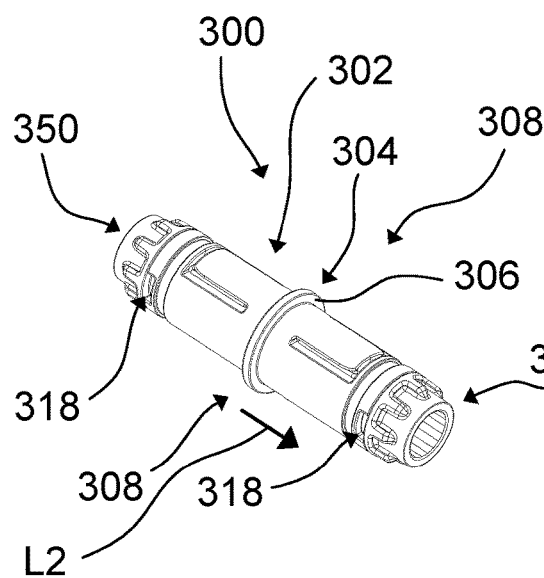
FIGS. 26 and 27 show a mounting aid according to a further embodiment.
Figure 27:
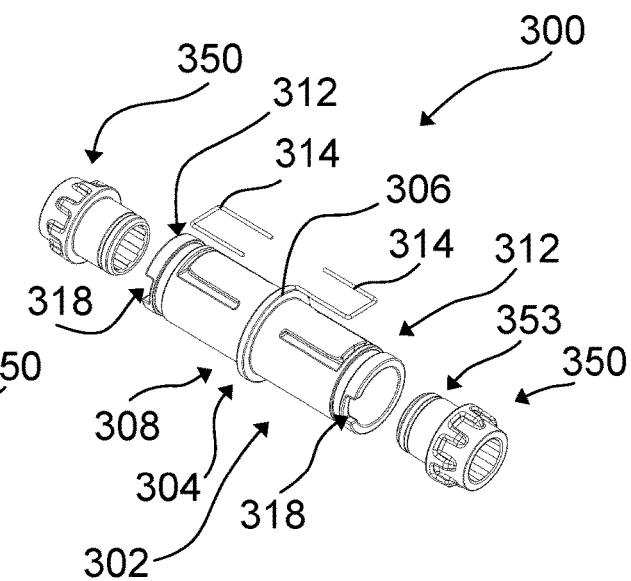
Figure 28:
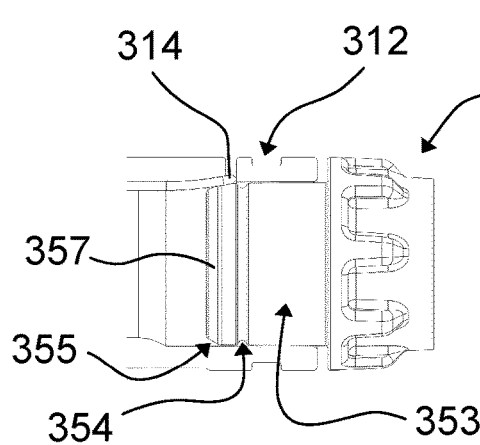
FIGS. 28 and 29 show an insertion process of an insert usable in connection with the mounting aid shown in FIGS. 26 and 27.
Figure 29:
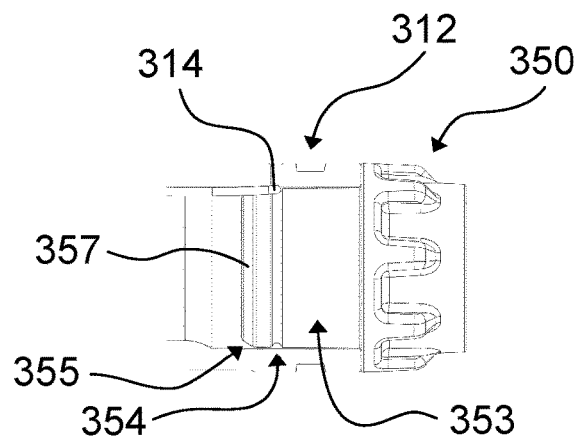

In general, the mounting aid 300 comprises an elongated main portion 302 and is configured to receive different types of inserts 350. The main portion 302 comprises a cylindrical shape. On its outer circumference, the main portion 302 can comprise a guiding portion 304 which may be embodied as a protrusion as shown in FIGS. 26 and 27. However, such a guiding portion 304 is only necessary if the mounting aid 300 is to be used in connection with a guiding arrangement, for example with a guiding arrangement 600 as described above. According to an embodiment, the guiding portion 304 can be omitted. According to a modification as shown in FIG. 23, the main portion 302 can also be configured such that it is fixedly mountable on a bike carrier, for example on a bike carrier as shown in FIGS. 34 to 36. For that, the main portion 302 can comprise a mounting recess 307 configured to cooperate with a mounting bracket 702 of a supporting unit 700 of a bike carrier. Furthermore, according to the modification, the main portion 302 can comprise a protrusion 303 extending in longitudinal direction of the main portion 302 which is configured to be inserted into a groove 704, 706 provided in a supporting unit 700 of a bike carrier as shown in FIGS. 34 to 36. As already mentioned, such grooves 704, 706 extend in lateral direction of the supporting unit 700 in a mounting portion 710. The mounting portion 710 is a sleeve-like arrangement having two lateral openings 712 on opposite sides and a cylindrical inner wall ranging from one opening to the other and having the grooves 704, 706 formed therein. Each groove is arranged such that it is accessible from only one opening and is configured to help centering the mounting aid 300 in the supporting unit 700. Since the grooves do not extend fully through the mounting portion 710, a wall portion 720 is available serving as a stop on a side opposite to the insertion side of the mounting aid 300 and defining an optimum position for the mounting aid 300 in cooperation with the protrusion 403.

As already mentioned, the guiding portions 304 and 404 of the mounting aids 300, 400 described before are configured to cooperate with the guiding arrangement 600 and can be embodied as protrusions 306, 406. In the embodiments, the protrusions 306, 406 extend fully about the outer circumference of each main portion 302, 402 and extend in a plane which extends perpendicular to a longitudinal direction L2 of the main portion 302; 402 and through a middle section 308; 408 of the main portion 302; 402.

Figure 30:
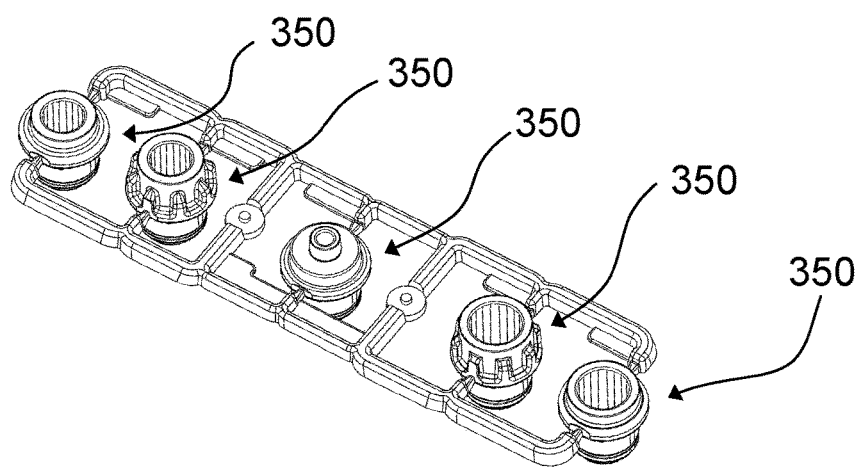
FIG. 30 shows different types of inserts usable in connection with the mounting aids of FIGS. 26 and 27.

The inserts 350 are adapted to the dimensions of a fork on which they are to be mounted on. The inserts can be provided as a set of differently dimensioned inserts 350 as shown in FIG. 30.

As is shown in the embodiment of FIG. 27, the main portion 302 comprises longitudinal ends 312 and inserts 350 can be mounted thereto. According to the embodiment, the longitudinal ends 312 are configured to receive an insert 350 by pressing the insert 350 on the longitudinal end 312. Furthermore, the longitudinal ends 312 are configured to snap-fittingly receive the insert 350. The main portion 302 comprises a catch 314 which is prebiased in locking direction. The catch 314 is configured to engage with a recess 354 provided on the insert 350. The catch 314 is embodied as a spring provided in a recess formed in the main portion 302. The recess in the main portion 302 is cut into the main portion 302 with a depth such that it interferes with an interior space of the main portion 302. Thus, when in locking position, the catch 314 protrudes into the interior space of the main portion 302 allowing an engagement with a coupling portion of an insert 350. The catch 314 is pre-biased towards the locking position and, thus, has to be pushed away upon inserting an insert 350. For that, the insert 350 according to the embodiment comprises a coupling portion 353 with a conical end portion 355 thereby providing a sliding surface 357 pushing the catch 314 outwards, more precisely outwards in radial direction of the insert 350, when the insert 350 is inserted in the main portion 302 (see FIG. 28), and may snap into the recess 354 in the coupling portion 353 when the insert 350 is correctly inserted in a locking position in which the catch 314 and the recess 354 are aligned (see FIG. 29). Furthermore, recesses 318 are provided in the longitudinal ends 312 facilitating a dismounting of the inserts 350. The recesses 318 may be configured to allow the user to better grasp the inserts for pulling them out of engagement or may be sized to allow the insertion of a tool for dismounting the inserts.

Figure 31:
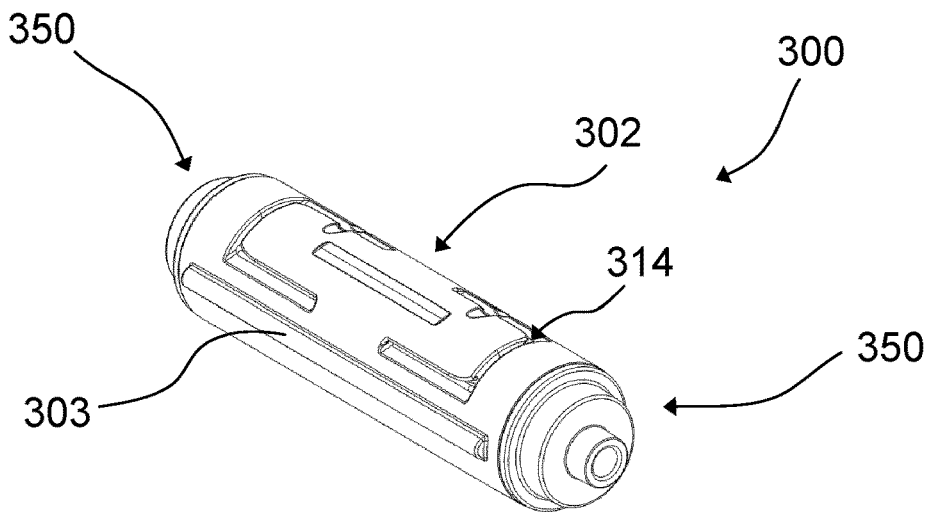
FIGS. 31 and 32 show components and possible configurations of a further mounting aid according to an embodiment.
Figure 32:
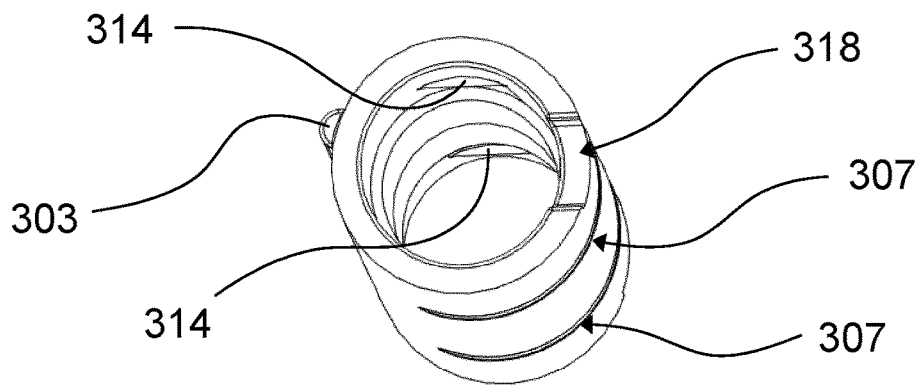

A modification of a mounting aid 300 is shown in FIGS. 31 and 32. The configuration differs from the configuration as shown in FIGS. 26 to 29 in that the main portion 302 is configured to be inserted into a modified supporting unit as shown in FIGS. 34 to 36. For that, the mounting aid 300 as shown in FIGS. 31 and 32 comprises similar features on the main portion 302 as the main portion shown in FIG. 23. More precisely, instead of a protrusion 306, the main portion comprises a protrusion 303 extending in longitudinal direction of the main portion and a recess 307 provided in the outer circumference. The protrusion 303 extending in longitudinal direction of the main portion 302 is configured to be inserted into a groove 704, 706 provided in a supporting unit 700 of a bike carrier as shown in FIGS. 34 to 36 as already described above.

Figure 33:
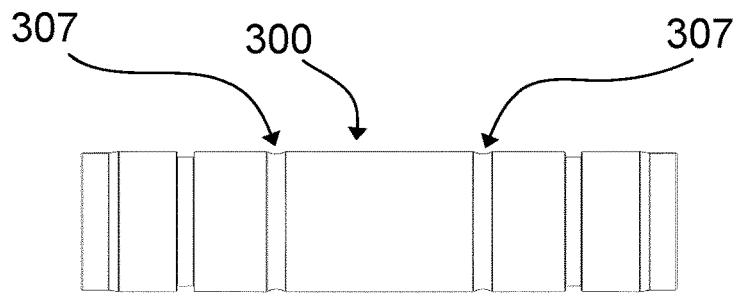
FIG. 33 shows a plan view of a mounting aid according to an embodiment.

FIG. 33 shows a configuration of a mounting aid 300 which is configured such that inserts may be screwed into the longitudinal ends of its main portion. Furthermore, the modified mounting aid 300 of FIG. 33 is configured to be mounted in a supporting unit 700 as shown in FIGS. 34 to 36 and thus comprises a mounting recess 307 configured to cooperate with a mounting bracket 702.

In the following, different configurations are represented in itemized structure in addition to the subject matter of claim 1 and the dependent claims and in addition to the explanations and configurations given in the introductory portion of this specification. It is to be noted that the below specific feature combinations are not intended to limit the disclosure to such specific feature combinations. By contrast, the below feature combinations merely provide different examples having improved capabilities. Features and embodiments as defined in the itemized configurations may be combined with other features and embodiments of other itemized configurations.

First Exemplary Configurations

1. Supporting unit (100) for a bike carrier (1), said supporting unit (100) being configured for fixedly holding/clamping a mounting portion (300; 400) mountable to the fork of a bike instead of a wheel or being formed by a part other than said wheel of said bike to be transported, for example by a portion of said fork of said bike, wherein said supporting unit (100) comprises a guiding arrangement (600) adapted to receive said mounting portion (300; 400) in a first direction (P1) cross to a longitudinal direction (L) of said supporting unit (100) and to guide said mounting portion (300; 400) in a second direction (P2) different to said first direction (P1) during insertion of said mounting portion (300; 400) such that said mounting portion (300; 400) is shifted to a desired fixation position on said supporting unit (100) at least in a direction cross to the longitudinal direction (L) of said supporting unit (100) upon inserting the same.

2. Supporting unit (100) according to item 1, wherein said guiding arrangement (600) comprises a guiding portion (602) configured to cooperate with a guiding portion (304; 404) of said mounting portion (300; 400).

3. Supporting unit (100) according to item 2, wherein said guiding portion (602) comprises a guiding recess (604) having a width that narrows towards said fixation position, wherein said guiding recess (604) is preferably formed at least partially funnel shaped, preferably with tapered walls at least in an insertion section (608) of said guiding recess (604).

4. Supporting unit (100) according to item 2, wherein said guiding portion comprises a guiding protrusion, preferably a guiding rib, in particular a guiding rib arranged in the center of said supporting unit (100) and extending in longitudinal direction of said supporting unit (100), said guiding rib being configured to be accommodated in said guiding portion of said mounting portion (300; 400) and said guiding portion of said mounting portion being provided with an accommodating recess preferably formed in said mounting portion in a funnel shape like manner, said recess being preferably formed by tapered walls and/or preferably having a width that widens towards a distal end of said mounting portion.

5. Supporting unit (100) according to one of the preceding items, wherein said mounting portion (300; 400) comprises an axle, said axle being preferably either a thru axle adapter axle (300) which is configured to be coupled to the fork by means of said thru axle of said fork, or a quick release adapter axle (400) which is configured to be coupled to the fork by means of a quick release skewer mechanism.

6. Mounting aid (300; 400) fixable to the fork of a bike, said mounting aid (300; 400) being configured to function as an interface between said fork and a bike carrier for fixedly mounting said fork to said bike carrier, said mounting aid (300; 400) comprising a sleeve shaped main portion (302; 402) with a guiding portion (304; 404) configured to cooperate with said guiding arrangement (600) of said supporting unit (100) during insertion of said mounting aid (300; 400) in said supporting unit (100) such that said mounting aid (300; 400) is shifted to a desired fixation position on said supporting unit (100) at least in a direction cross to the longitudinal direction (L) of said supporting unit (100) upon inserting said mounting aid (300; 400).

7. Mounting aid according to item 6, wherein said guiding portion (304; 404) comprises a protrusion (306; 406) provided on an outer circumference of said main portion (302; 402), said protrusion (306; 406) being configured to be accommodated in a guiding recess (604) provided in said guiding arrangement (600) of said supporting unit (100), said protrusion (306; 406) being preferably configured to extend at least partially, preferably fully, about said outer circumference of said main portion (302; 402), and extends preferably at least partially in a plane which extends cross to a longitudinal direction (L2) of said main portion (302; 402) and preferably extends perpendicular to the longitudinal direction (L2) of said main portion (302; 402) and/or extends through a middle section (308; 408) of said main portion (302; 402), preferably through the longitudinal center of said main portion (302; 402).

8. Mounting aid according to one of items 6 or 7, wherein said main portion (302) is configured to receive inserts (350) at its longitudinal ends (312), said inserts (350) being adapted to the dimensions of said fork to be mounted on said bike carrier (1).

Second Exemplary Configurations

1. Mounting aid (300) fixable to the fork of a bike, said mounting aid (300) being configured to function as an interface between said fork and a bike carrier for fixedly mounting said fork to said bike carrier, said mounting aid (300) comprising a sleeve shaped main portion (302) configured to receive inserts (350) at its longitudinal ends (312), said inserts (350) being adapted to the dimensions of said fork to be mounted on said bike carrier.

2. Mounting aid (300) according to item 1, wherein at least one of said longitudinal ends (312) is configured to receive said insert (350) in a direction cross to the longitudinal direction of said main portion (302) and preferably comprises a guiding portion adapted to slidably receive said insert (350), said guiding portion preferably comprising a recess and/or a protrusion extending perpendicular or skew to a longitudinal axis of said main portion (302) and being configured for a slidable engagement with said insert (350).

3. Mounting aid (300) according to item 1, wherein at least one of said longitudinal ends (312) is configured to receive said insert (350) by at least partially rotating said insert (350) relative to said main portion (302), preferably by screwing said insert (350) into said longitudinal end (312) or by fixing said insert (350) to said longitudinal end (312) by means of a bayonet coupling.

4. Mounting aid (300) according to item 1, wherein at least one of said longitudinal ends (312) is configured to receive said insert (350) by pressing said insert (350) on said longitudinal end (312) and/or wherein at least one of said longitudinal ends (312) is configured to snap-fittingly or friction-fittingly receive said insert (350) and/or wherein said main portion (302) preferably comprises a catch (314), preferably prebiased in locking direction, said catch (314) being configured to engage with said insert (350), preferably with a recess (354) provided on said insert (350).

5. Mounting aid (300) according to one of items 1 to 4, wherein said sleeve shaped main portion (302) comprises a guiding portion (304) configured to cooperate with a guiding arrangement (600) of a supporting unit (100) during insertion of said mounting aid (300) in said supporting unit (100) such that said mounting aid (300) is shifted to a desired fixation position on said supporting unit (100) at least in a direction cross to the longitudinal direction of said supporting unit (100) upon inserting said mounting aid (300).

6. Mounting aid (300) according to item 5, wherein said guiding portion (304) comprises a protrusion (306) provided on an outer circumference of said main portion (302), said protrusion (306) being configured to be accommodated in a guiding recess (604) provided in said guiding arrangement (600) of said supporting unit (100), said protrusion (306) being preferably configured to extend at least partially, preferably fully, about said outer circumference of said main portion (302), and extends preferably at least partially in a plane which extends cross to a longitudinal direction of said main portion (302) and preferably extends perpendicular to the longitudinal direction of said main portion (302) and/or extends through a middle section (308) of said main portion (302), preferably through the longitudinal center of said main portion (302).

7. Insert (350) for adapting a mounting aid (300) to a fork of a bike, said insert (350) comprising a coupling portion (353) to be inserted on said mounting aid (600) according to one of the preceding items, said coupling portion (353) being either configured to enter into a longitudinal end (312) or configured to slide on said longitudinal end (312).

8. Insert (350) according to item 7, wherein said coupling portion (353) comprises a recess (354) for accommodating an engaging portion of a catch (314) for establishing a snap-fit connection in said mounting aid (300).

9. Insert (350) according to item 7, wherein said coupling portion (353) comprises a threaded portion engageable with a threaded portion on said longitudinal end or a recessed portion in which an O-ring is accommodated.

10. Insert (350) according to item 7, wherein said coupling portion (353) is configured such that said insert is insertable on said longitudinal end (312) in a direction cross to the longitudinal direction of said insert and preferably comprises a guiding section adapted to be slidably moved on said longitudinal end.

11. Mounting system, said mounting system comprising a mounting aid (300) according to one of items 1 to 6 and an insert (350) according to one of items 7 to 10.

Third Exemplary Configurations

1. Mounting aid (400) fixable to the fork of a bike, said mounting aid (400) being configured to function as an interface between said fork and a bike carrier for fixedly mounting said fork to said bike carrier, said mounting aid comprising an elongated main portion (402) and a quick release skewer type clamping mechanism (410) configured to simultaneously clamp each end portion of said fork between a movable clamping member (440, 450) and said main portion (402), each movable clamping member (440, 450) being preferably configured for a direct contact with the respective end portion and being arranged so as to be movable with respect to said main portion (402) in a non-rotatable but axially movable manner.

2. Mounting aid (400) according to item 1, wherein each movable clamping member (440, 450) comprises an elongated support portion (442, 452), preferably a shaft (444) or a hollow shaft (454), slidably accommodated in a support opening (412, 414) of said main portion (402), said elongated support portion (442, 452) and said support opening (412, 414) preferably comprising at least partially non-round cross-sectional outer and inner contours, respectively, and/or wherein said cooperating non-round cross-sectional contours are provided between said shaft (444) and said movable clamping member (450) and/or between said movable clamping member (450) and said main portion (402) and/or wherein preferably said support portion (442, 452) comprises a flat surface section (443, 453) and said support opening (412; 414) comprises a correspondingly shaped flat inner surface section.

3. Mounting aid (400) according to one of the preceding items, wherein each movable clamping member (440, 450) comprises a force application portion (446, 456) and said main portion (402) comprises clamping portions (420, 422) each configured for supporting an end portion of said fork of said bike when a force is applied on said end portion by said force application portion (446, 456).

4. Mounting aid (400) according to item 2 or 3, wherein a first movable clamping member (440) of said movable clamping members (440, 450) comprises a coupling section (449), preferably a threaded portion provided on said shaft (444), for coupling said first movable clamping member (440) to a force application member (466), in particular a force application member for applying a pulling force on said first movable clamping member (440), wherein said first movable clamping member (440) is preferably configured and arranged in said main portion (402) such that said coupling section (449) and said force application portion (446) are arranged on opposite sides of said main portion (402).

5. Mounting aid (400) according to item 4, wherein a second movable clamping member (450) of said movable clamping members (440, 450) is partially and slidably held in said main portion (402) between a portion of said shaft (444), preferably at least partially including said threaded portion on said shaft (444) when said mounting aid is in an open state, and said main portion (402) such that said second movable clamping member (450) is slidably held in said support opening (414) and said shaft (444) of said first movable clamping member (440) is slidably held in said second movable clamping member (450), in particular in a hollow shaft portion (454) of said second movable clamping member (450).

6. Mounting aid (400) according to one of the preceding items, further comprising urging members (416, 418), preferably springs, said urging members (416, 418) being coupled to said movable clamping members (440, 450) such that said movable clamping members (440, 450) are prebiased towards an open position, wherein said urging members (416, 418) are preferably configured so as to apply substantially the same urging force on the movable clamping members.

7. Mounting aid (400) according to one of the preceding items, wherein said mounting aid (400) further comprises an operating unit (470) configured to be operated by a user and configured to transfer an operating force on said movable clamping members (440, 450), wherein said operating unit (470) is preferably configured to transfer said operating force on one of said movable clamping members (450) by means of an urging member (464), preferably a spring pack comprising preferably one or more spring washers such as Belleville washers, such that a preferably strong bias is generated when said movable clamping members (440, 450) are in a closed position in order to absorb any movement of the movable members (440, 450) during use of said mounting aid (400) so that a sufficient clamping force can be securely maintained during use of said mounting aid (400).

8. Mounting aid (400) according to item 7, wherein said operating unit (470) preferably comprises an operating member (472), preferably a knob or an eccenter lever, and/or wherein said operating unit (470) is preferably configured to apply a pushing force on said second movable clamping member (450) and is preferably configured to apply a pulling force on said first movable clamping member (440).

9. Mounting aid (400) according to item 8, wherein said operating unit (470) comprises a force application member (466) threadedly engaged with a threaded portion (449) of said first movable clamping member (440) and force transmittingly coupled to said second movable clamping member (450) by means of said urging member (464) such that an operation of said operating unit (470) urges said first movable clamping member (440) and said second movable clamping member (450) in opposite directions.

10. Mounting aid (400) according to item 9, wherein force application member (466) is arranged coaxially with said movable clamping members (440, 450) and comprises a force application portion (468), preferably a flange protruding in radial direction of said force application member (466), configured to apply a force on said urging member (464), said force application portion (468) being preferably configured to receive a torque from said operating unit (470), preferably from a torque limiting mechanism (474), wherein said torque limiting mechanism (474) preferably comprises a force application member (476) with a force application section (478) configured to apply said torque on said force application portion (468) and preferably with a housing section (480) defining an accommodating space for at least partially accommodating said urging member (464) and preferably configured to partially accommodate a force receiving portion (462) of said second movable clamping member (450) so that said urging member (464) and said force application portion (468) are arranged between said force receiving portion (462) and said force application section (478) of said force application member (476).

The invention claimed is:

1. A supporting unit for a bike carrier, said supporting unit configured to fixedly hold an axle mountable to a fork of a bike, said supporting unit comprising:
a locking mechanism configured to receive said axle and to be transferable between a locking state in which said axle is non-releasably fixed on said supporting unit and an unlocking state in which said axle is dismountable from said supporting unit,
wherein said locking mechanism is configured to be lockable by receiving a force from said axle upon inserting said axle into said supporting unit, and wherein said locking mechanism is transferable into said locking state by said force exerted on said locking mechanism by said axle.

2. The supporting unit of claim 1, wherein said axle is a thru axle of said bike configured to mount said wheel to said fork, a thru axle adapter axle configured to be coupled to said fork by said thru axle of said fork, or a quick release adapter axle configured to be coupled to said fork by a quick release skewer mechanism.

3. The supporting unit of claim 1, wherein said locking mechanism comprises an arrangement for positively locking said axle between at least two locking members, wherein at least one of said at least two locking members is arranged movable with respect to another one of said at least two locking members to positively lock said axle.

4. The supporting unit of claim 3, wherein said at least two locking members comprise receiving sections for partially receiving said axle, and clamping sections configured to clamp said axle when said locking mechanism is in said locking state.

5. The supporting unit of claim 4, wherein at least one of said receiving sections comprises a shape at least partially following an outer contour of said axle.

6. The supporting unit of claim 3, wherein said locking mechanism is configured to at least partially automatically transfer into said locking state when said axle is at least partially inserted into said supporting unit.

7. The supporting unit of claim 3, further comprising a blocking unit configured to block a movement of said at least one movable locking member in at least an opening direction of said at least one movable locking member,
wherein said blocking unit comprises an engaging unit configured to engage behind or with said at least one movable locking member to temporarily block a movement of said at least one movable locking member in said opening direction.

8. The supporting unit of claim 7, wherein said blocking unit comprises a blocking member configured to move between a locking position and an unlocking position, wherein said blocking member is configured to translate, pivot, or both in said blocking unit.

9. The supporting unit of claim 8, wherein said blocking member is biased towards said locking position by a biasing member wherein said blocking member is configured to automatically engage behind or with said at least one movable locking member when said at least one movable locking member is moved by a predetermined distance towards a positive locking position.

10. The supporting unit of claim 9, wherein said biasing member is a coil spring.

11. The supporting unit of claim 8, wherein said blocking member comprises a cam surface configured for sliding contact with a force receiving portion directly or indirectly coupled with said at least one movable locking member, wherein said cam surface is configured such that a force exerted on said force receiving portion is directed such that said at least one movable locking member is urged towards a positive locking position.

12. The supporting unit of claim 8, further comprising an operating lever configured to return said blocking member into said unlocking position.

13. The supporting unit of claim 12, further comprising a cross bar attachment member configured to couple said supporting unit to a cross bar of a load carrier.

14. The supporting unit of claim 13, further comprising an operating member configured to operate said cross bar attachment member, wherein said operating member is arranged below or behind said operating lever.

15. The supporting unit of claim 3, wherein said at least one movable locking member is arranged on said supporting unit movable towards and away from said positive locking position, wherein said at least one movable locking member is configured and arranged pivotably about a pivot axis, wherein at least one movable locking member is pivoted by said force exerted by said axle, and configured such that a bike weight force pivots said at least one movable locking member towards said positive locking position.

16. The supporting unit of claim 3, wherein at least one movable locking member is arranged on said supporting unit movable towards and away from a positive locking position, wherein said at least one movable locking member is slidingly movable along a path which is oriented in a descending manner towards said positive locking position such that said force received from said axle in a vertical downward direction is at least partially transferred into a pushing force towards said positive locking position.

17. A bike carrier, comprising:
a supporting unit for a bike carrier, said supporting unit configured to fixedly hold an axle coupled to a fork of a bike, said supporting unit comprising:
a locking mechanism configured to receive said axle and to be transferable between a locking state in which said axle is non-releasably fixed on said supporting unit and an unlocking state in which said axle is dismountable from said supporting unit,
wherein said locking mechanism is configured to be lockable by receiving a force from said axle upon inserting said axle into said supporting unit, and wherein said locking mechanism is transferable into said locking state by said force exerted on said locking mechanism by said axle; and
a supporting bar coupled to said supporting unit and configured to directly or indirectly support a rear wheel of said bike.

18. A method of mounting a mounting portion provided on a bike onto a supporting unit, comprising the steps of:
inserting said mounting portion in a receiving section of a movable locking member of a locking mechanism, wherein said mounting portion is an axle mounted to a fork of a bike; and
moving said mounting portion into a stationary locking member thereby moving said movable locking member into a positive locking position in which a movement of said movable locking member in an opening direction is automatically blocked.

19. The method of claim 18, wherein said movable locking member is movable along a path that is oriented in a descending manner towards said positive locking position.

* * * * *